United States Patent
Tsubouchi et al.

(10) Patent No.: US 9,084,168 B2
(45) Date of Patent: Jul. 14, 2015

(54) RELAY STATION, BASE STATION, MOBILE STATION, COMMUNICATION SYSTEM, AND COMMUNICATION METHOD

(75) Inventors: Koji Tsubouchi, Yamato (JP); Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 411 days.

(21) Appl. No.: 13/594,179

(22) Filed: Aug. 24, 2012

(65) Prior Publication Data
US 2012/0322363 A1 Dec. 20, 2012

Related U.S. Application Data

(63) Continuation of application No. PCT/JP2010/054151, filed on Mar. 11, 2010.

(51) Int. Cl.
*H04B 3/36* (2006.01)
*H04W 36/22* (2009.01)
*H04B 7/155* (2006.01)
*H04W 84/04* (2009.01)

(52) U.S. Cl.
CPC .............. *H04W 36/22* (2013.01); *H04B 7/155* (2013.01); *H04W 84/047* (2013.01)

(58) Field of Classification Search
CPC ...... H04B 7/02; H04B 7/145; H04B 7/15507; H04B 7/15514; H04B 7/15528; H04B 7/15542; H04B 7/15557; H04B 7/15564; H04B 7/15592; H04B 7/15; H04B 7/14; H04W 36/22; H04W 84/045; H04W 84/047
USPC ............. 455/11.1, 7, 524, 525, 9, 67.11, 453, 455/450, 507, 418, 501, 438, 445, 422.1, 455/437; 370/400, 315, 389, 328, 329, 349, 370/279, 331
See application file for complete search history.

(56) References Cited

U.S. PATENT DOCUMENTS

| | | | |
|---|---|---|---|
| 7,986,915 B1 * | 7/2011 | Wang et al. | 455/7 |
| 8,477,790 B2 * | 7/2013 | Shin et al. | 370/400 |
| 8,504,053 B2 * | 8/2013 | Hwang et al. | 455/452.2 |
| 2002/0191558 A1 * | 12/2002 | Agrawal et al. | 370/329 |
| 2004/0005882 A1 * | 1/2004 | Yoshii | 455/422.1 |
| 2007/0066315 A1 * | 3/2007 | Kado | 455/445 |

(Continued)

FOREIGN PATENT DOCUMENTS

WO 2009/050794 4/2009

OTHER PUBLICATIONS

CATT; "Selection of Donor Cell"; Agenda Item: 6.9.3.2; 3GPP TSG RAN WG2 Meeting #69; R2-101098; San Francisco, US; Feb. 22-26, 2009.

(Continued)

*Primary Examiner* — Tan Trinh
(74) *Attorney, Agent, or Firm* — Myers Wolin, LLC

(57) ABSTRACT

A relay station capable of communicating with a first base station, a second base station, and a mobile station, includes a relay unit configured to relay communication between the first base station and the mobile station; a receiving unit configured to receive load information concerning the second base station; and a changeover unit configured to change, from the first base station over to the second base station, a communication counterpart of the mobile station, communicating with the mobile station via the relay unit, the communication counterpart being changed based on the received load information.

21 Claims, 35 Drawing Sheets

(56) References Cited

U.S. PATENT DOCUMENTS

| | | | |
|---|---|---|---|
| 2007/0217433 A1* | 9/2007 | Doppler et al. | 370/400 |
| 2008/0013606 A1* | 1/2008 | Boariu et al. | 375/211 |
| 2008/0232296 A1* | 9/2008 | Shin et al. | 370/315 |
| 2009/0016258 A1* | 1/2009 | Zhang et al. | 370/315 |
| 2009/0082002 A1* | 3/2009 | Kim et al. | 455/418 |
| 2009/0181694 A1* | 7/2009 | Byun et al. | 455/453 |
| 2009/0207761 A1* | 8/2009 | Tangemann et al. | 370/281 |
| 2009/0318155 A1* | 12/2009 | Fukuzawa et al. | 455/438 |
| 2010/0035620 A1* | 2/2010 | Naden et al. | 455/450 |
| 2010/0173644 A1 | 7/2010 | Koyanagi | |
| 2010/0329216 A1* | 12/2010 | Jen | 370/332 |
| 2011/0038284 A1* | 2/2011 | Senarath et al. | 370/279 |
| 2011/0171926 A1* | 7/2011 | Faccin et al. | 455/404.1 |
| 2011/0171965 A1* | 7/2011 | Klein et al. | 455/450 |
| 2011/0317616 A1* | 12/2011 | Seo et al. | 370/315 |
| 2012/0034865 A1* | 2/2012 | Seki | 455/7 |
| 2012/0052796 A1* | 3/2012 | Takano | 455/7 |
| 2012/0083274 A1* | 4/2012 | Tajima et al. | 455/436 |
| 2012/0142357 A1* | 6/2012 | Aminaka | 455/437 |
| 2012/0170507 A1* | 7/2012 | Sawai | 370/315 |
| 2013/0064218 A1* | 3/2013 | Sundaresan et al. | 370/330 |

OTHER PUBLICATIONS

Notice of Rejection issued for corresponding Japanese Patent Application No. 2012-504240, drafted Aug. 6, 2013, with translation of relevant part p. 1, lines 1 to 5 and p. 1, lines 9 to 28.

International preliminary report on patentability issued for corresponding International Patent Application No. PCT/JP2010/054151, mailed Oct. 11, 2012 with English translation.

* cited by examiner

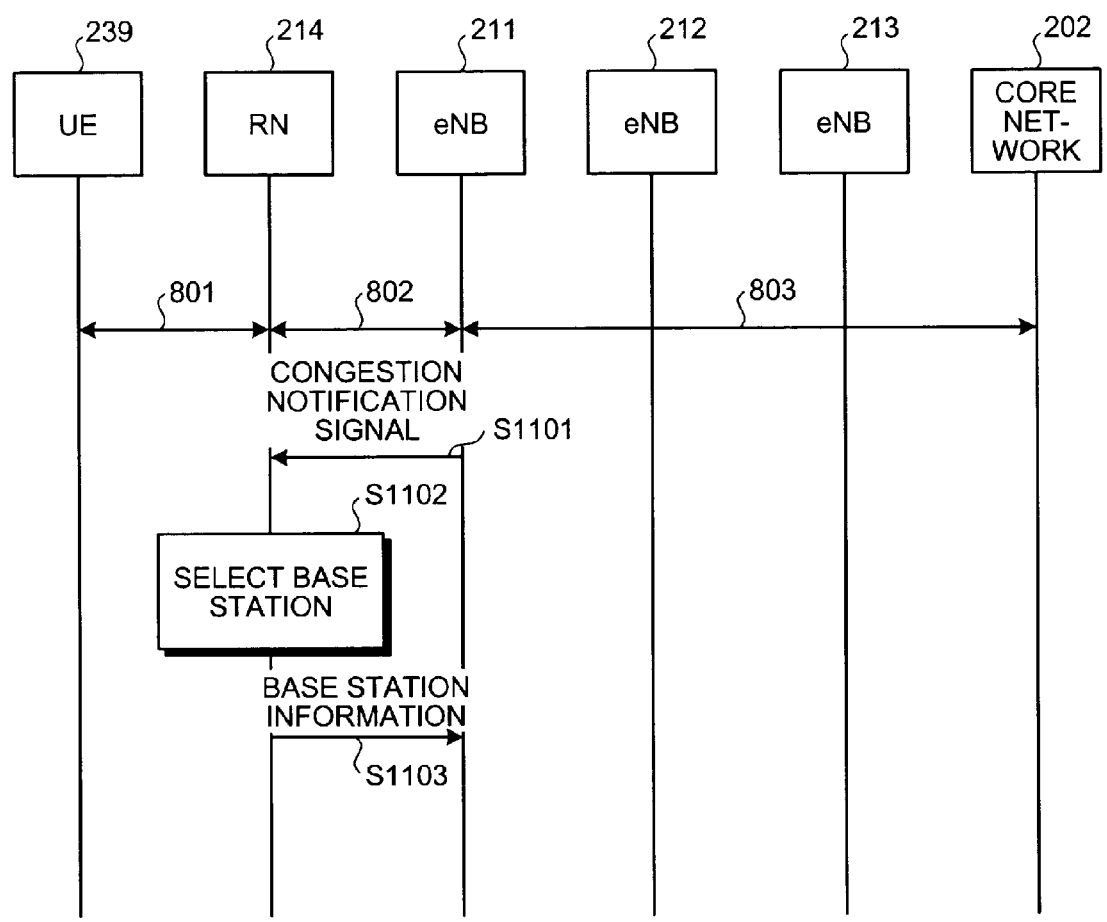

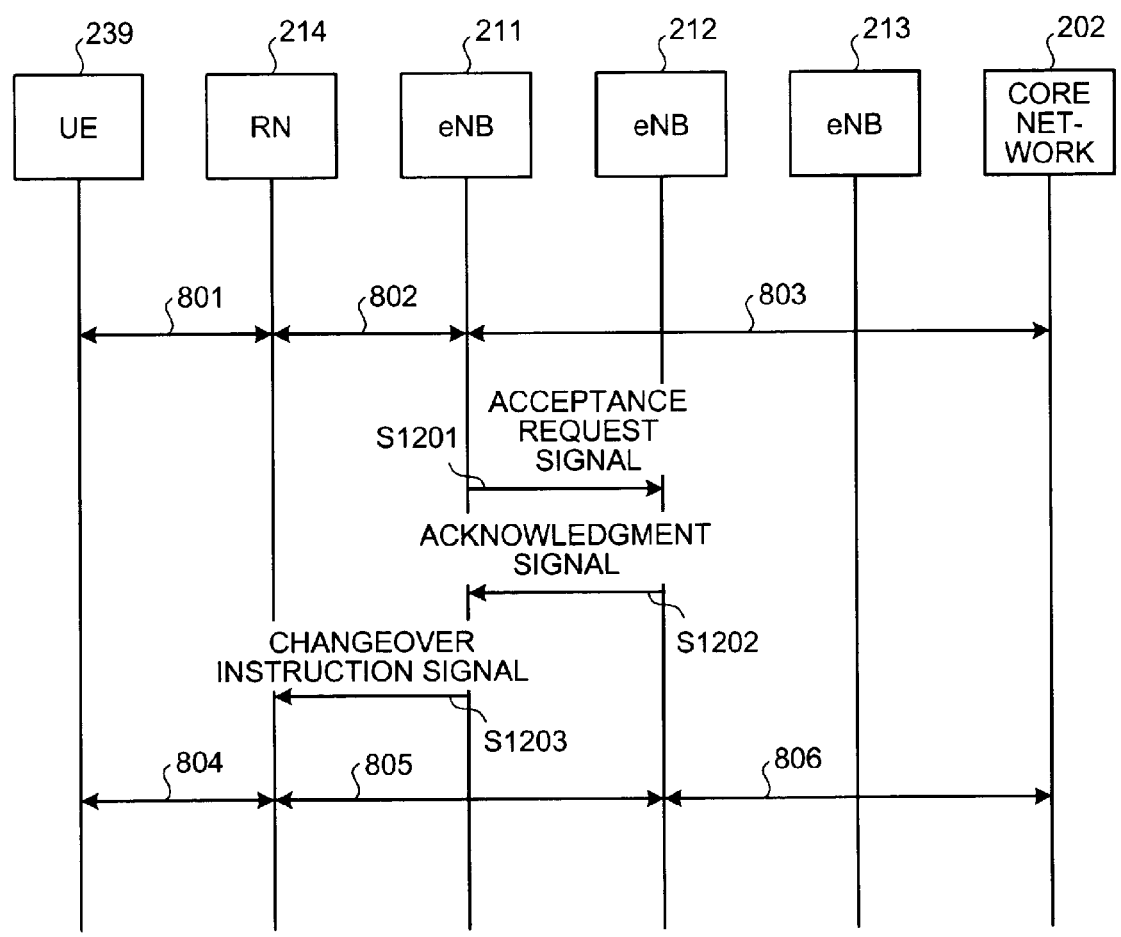

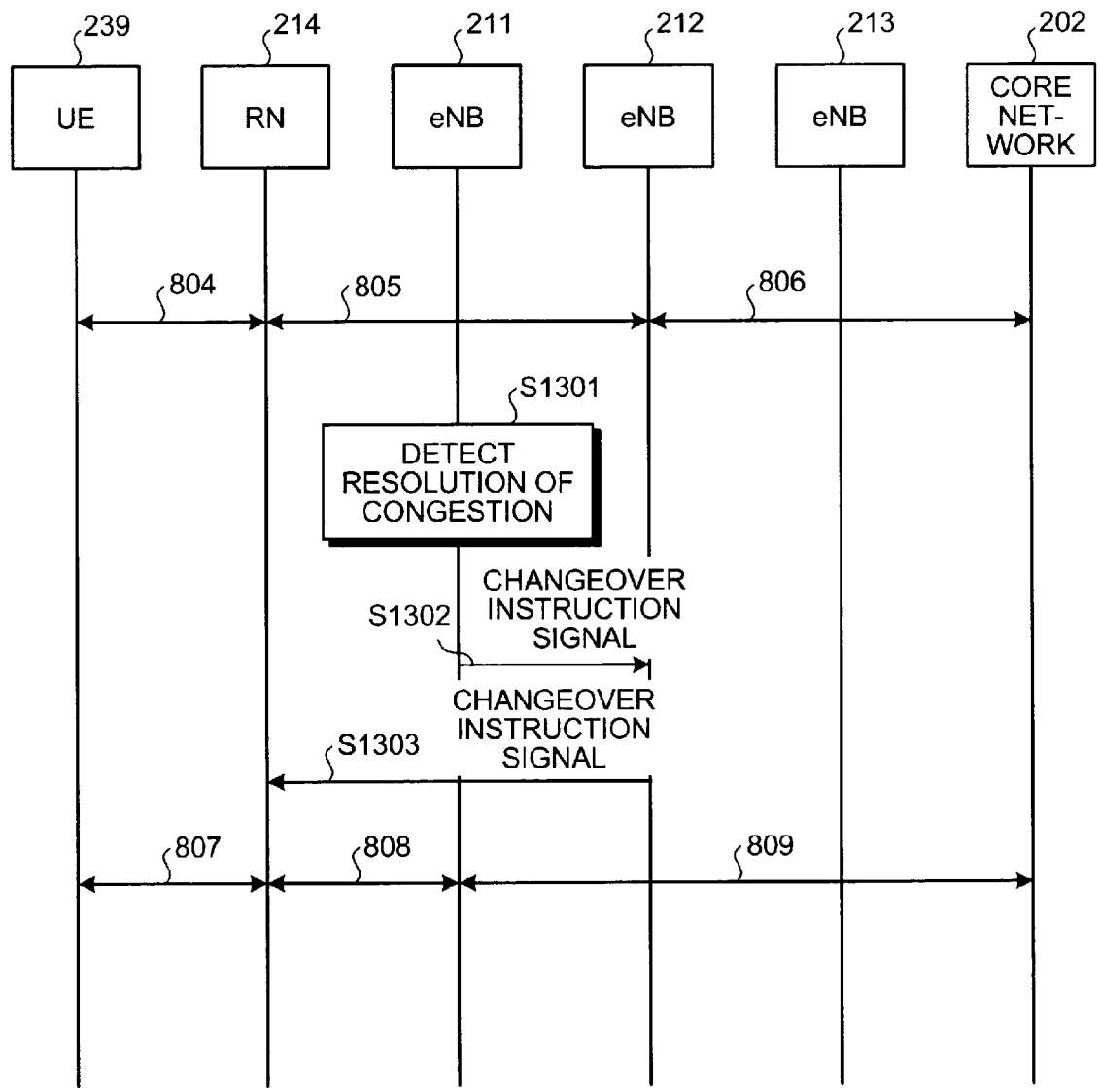

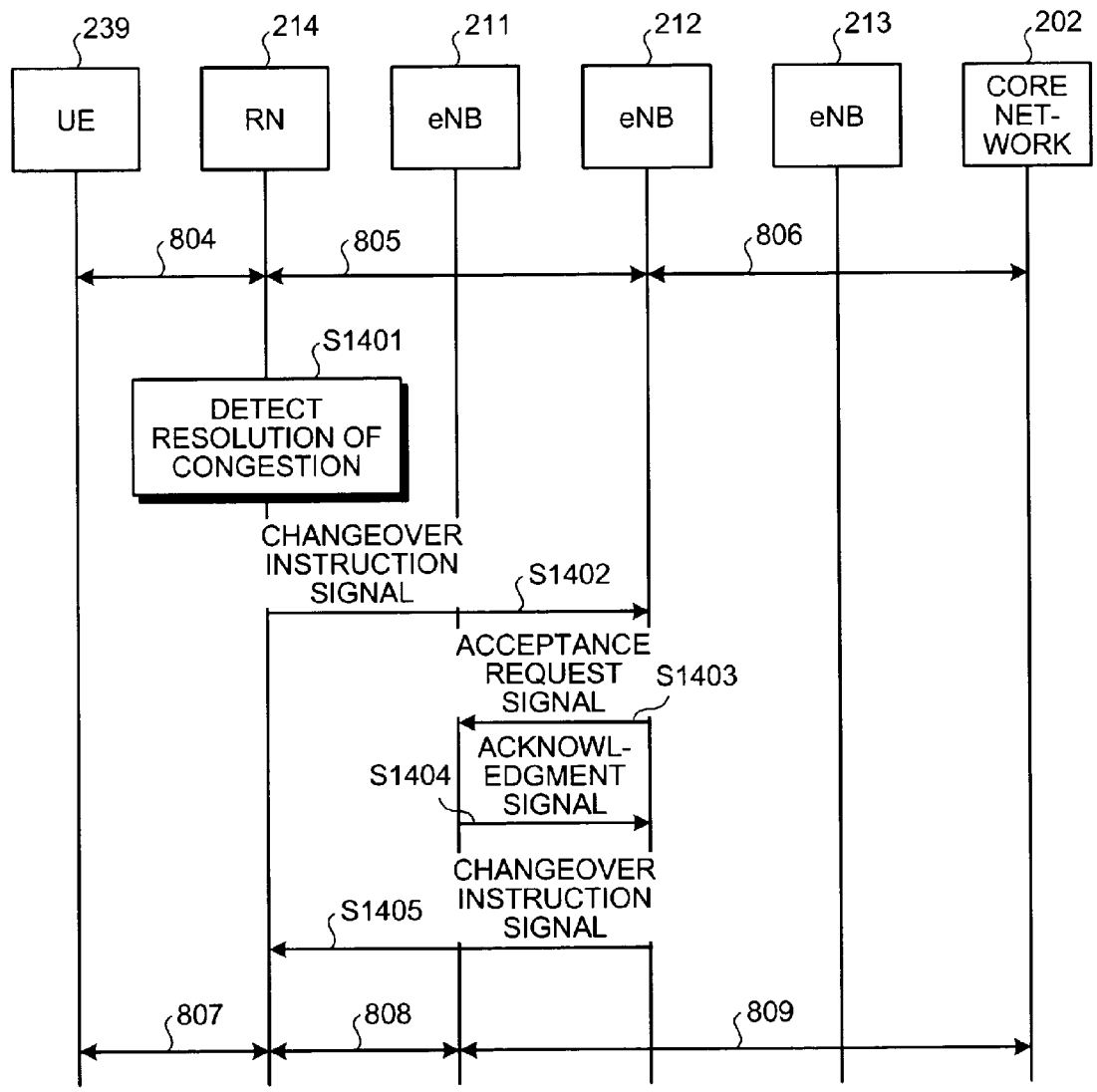

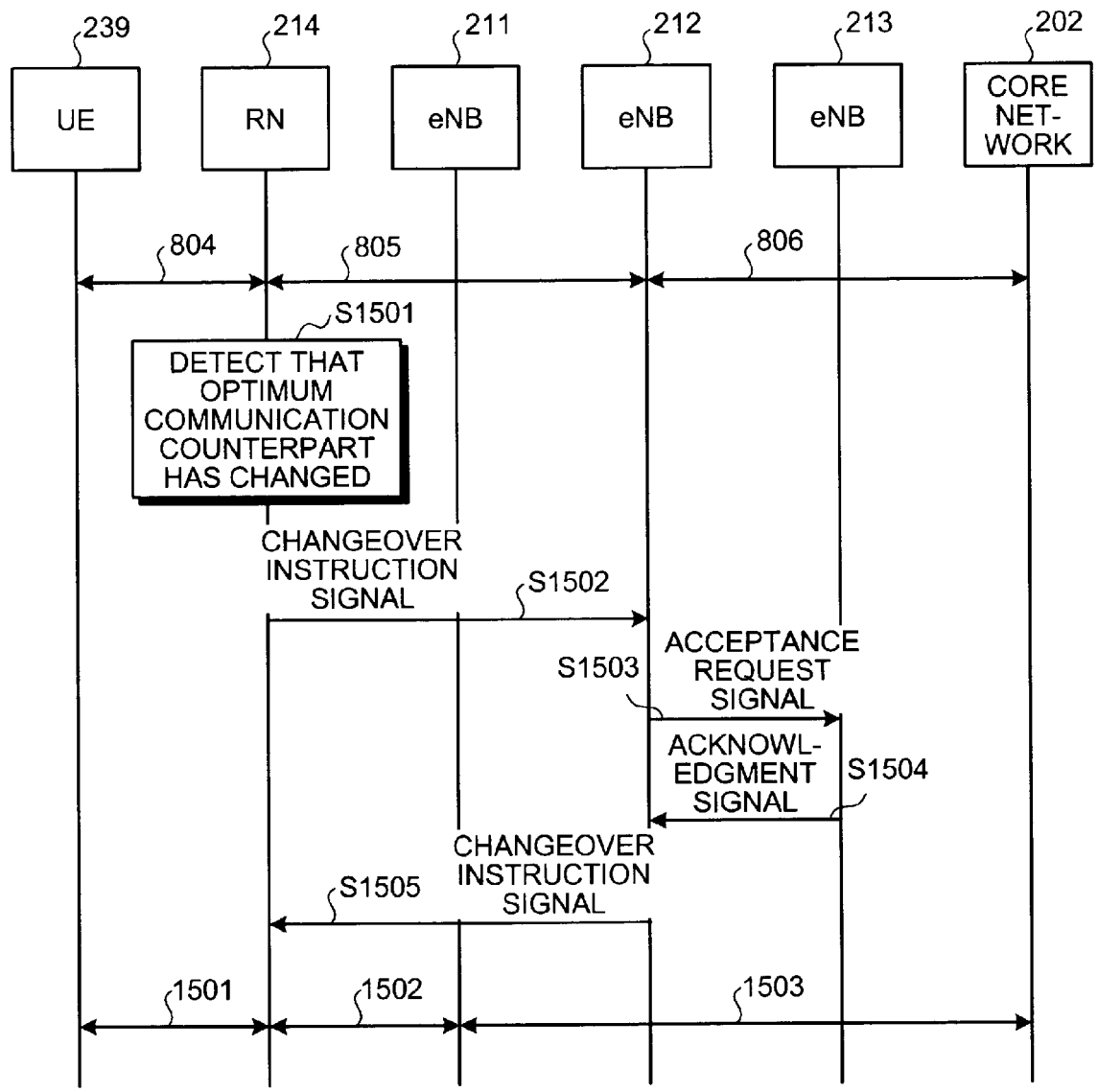

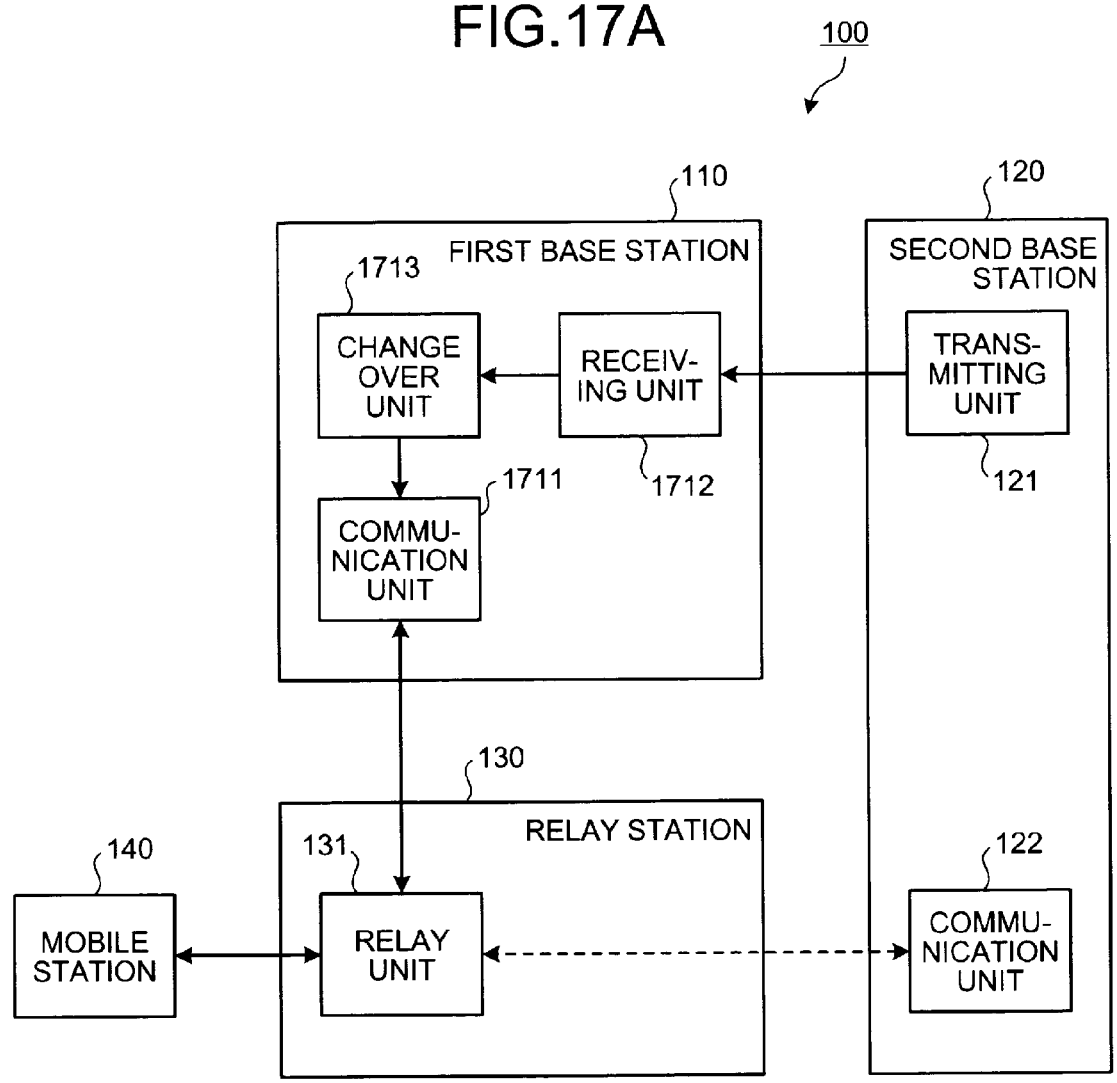

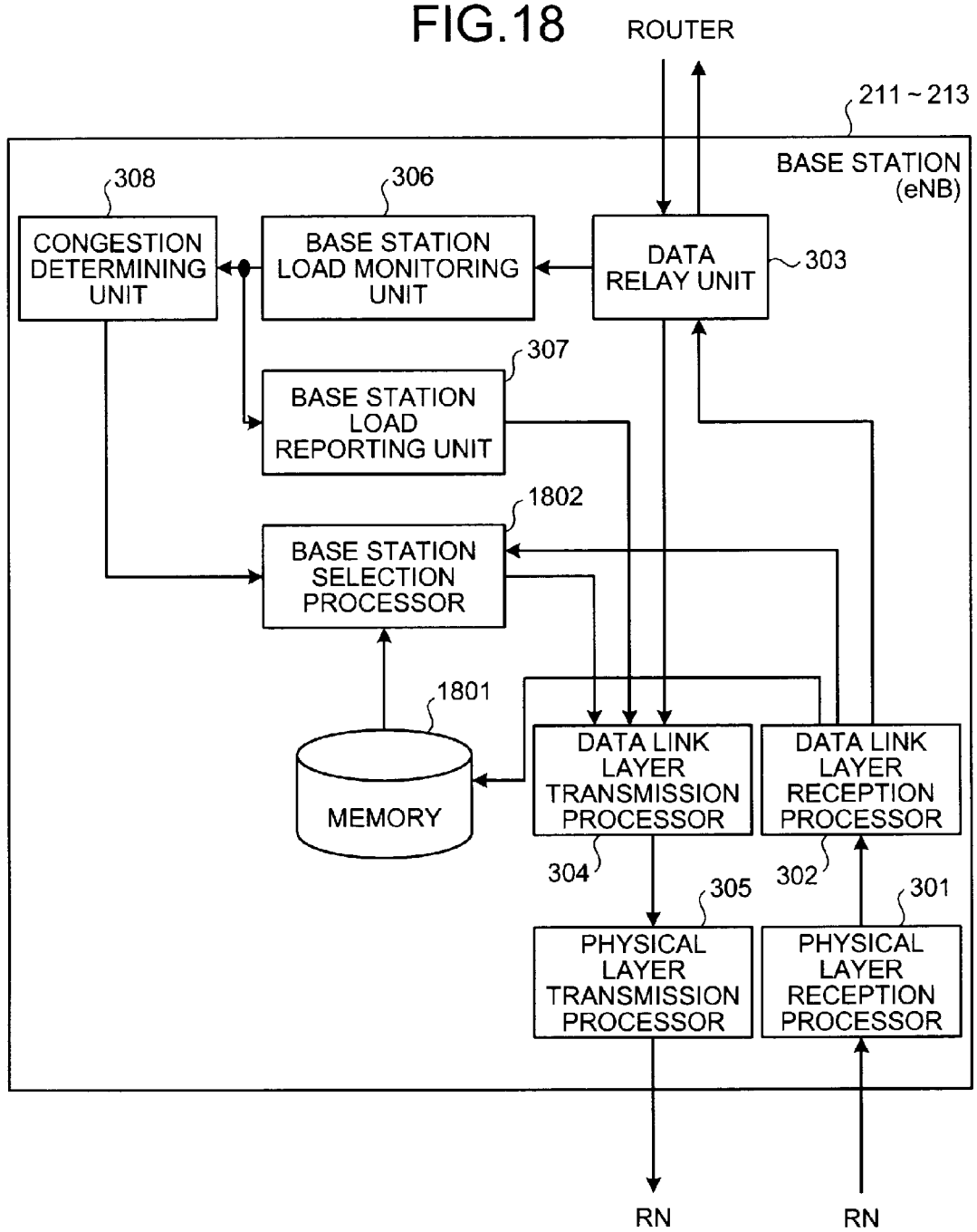

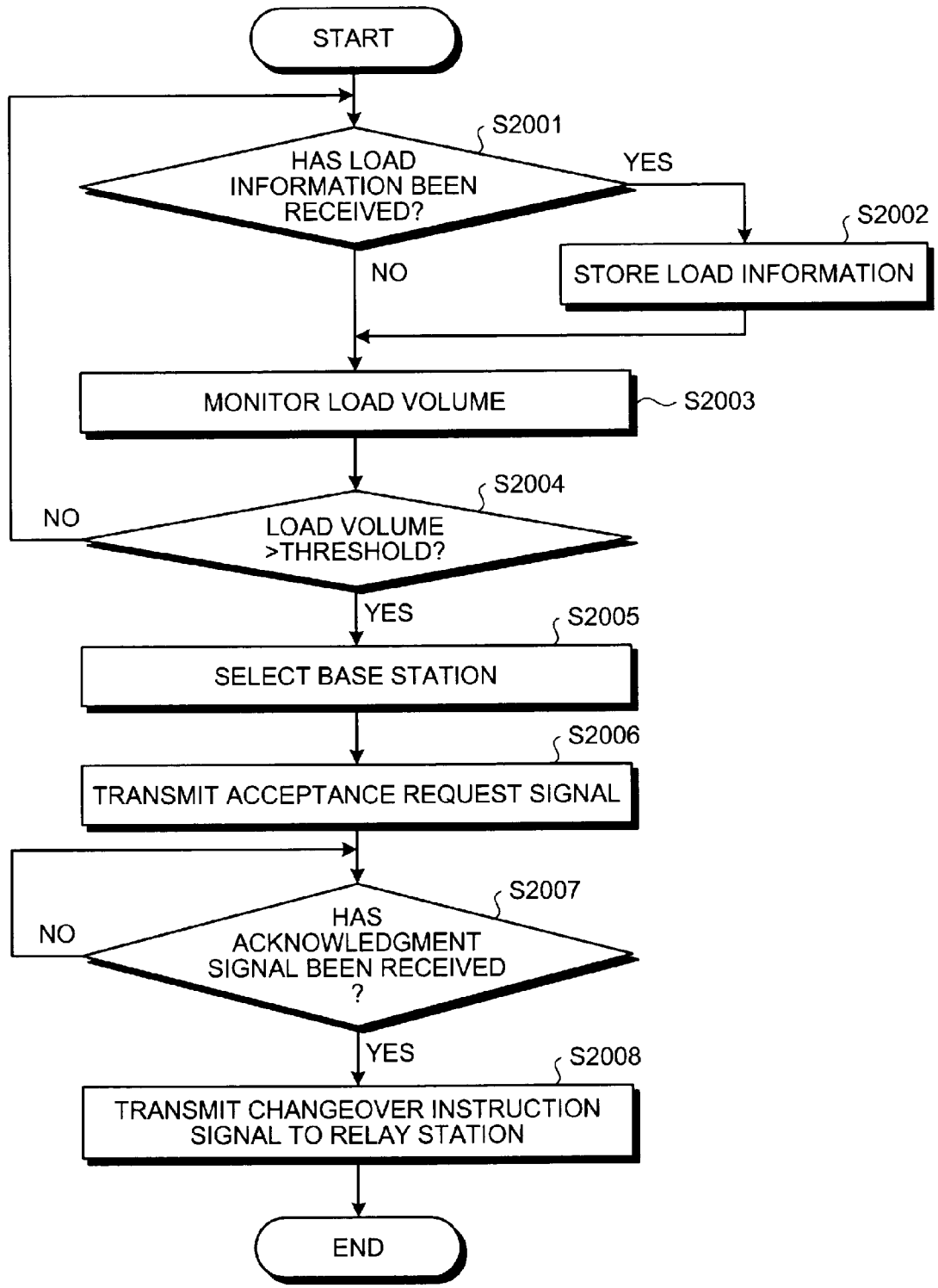

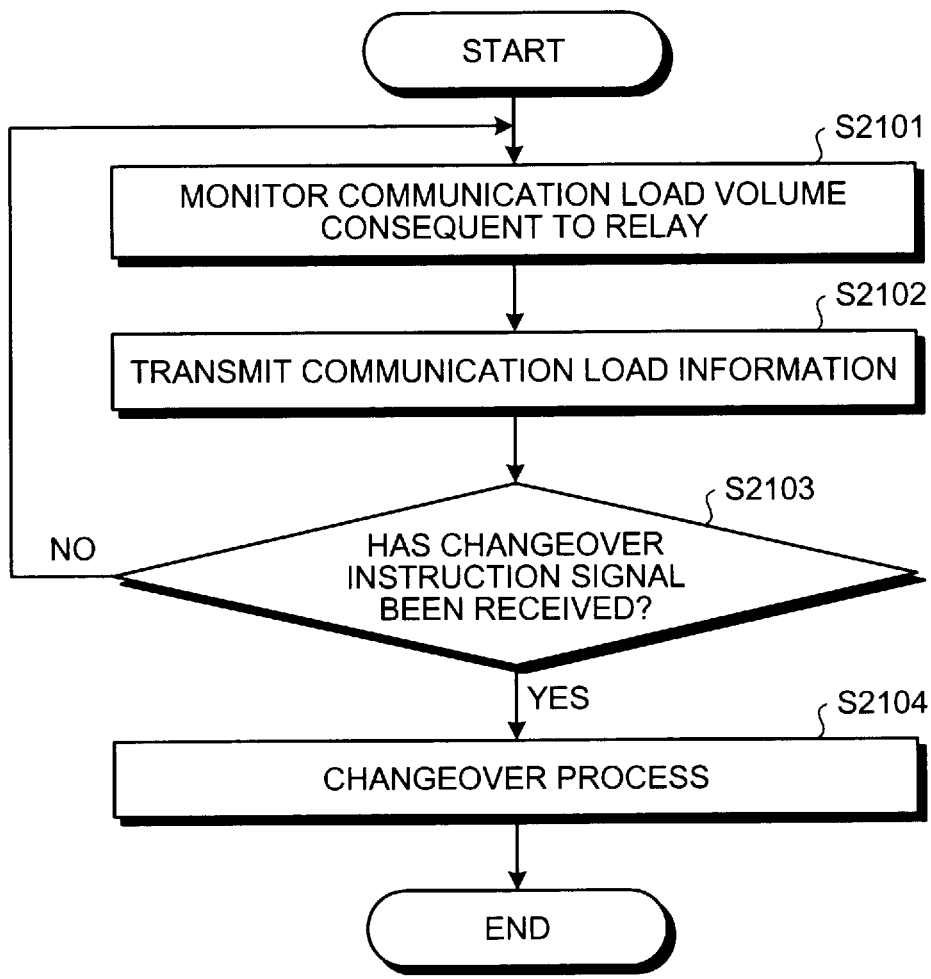

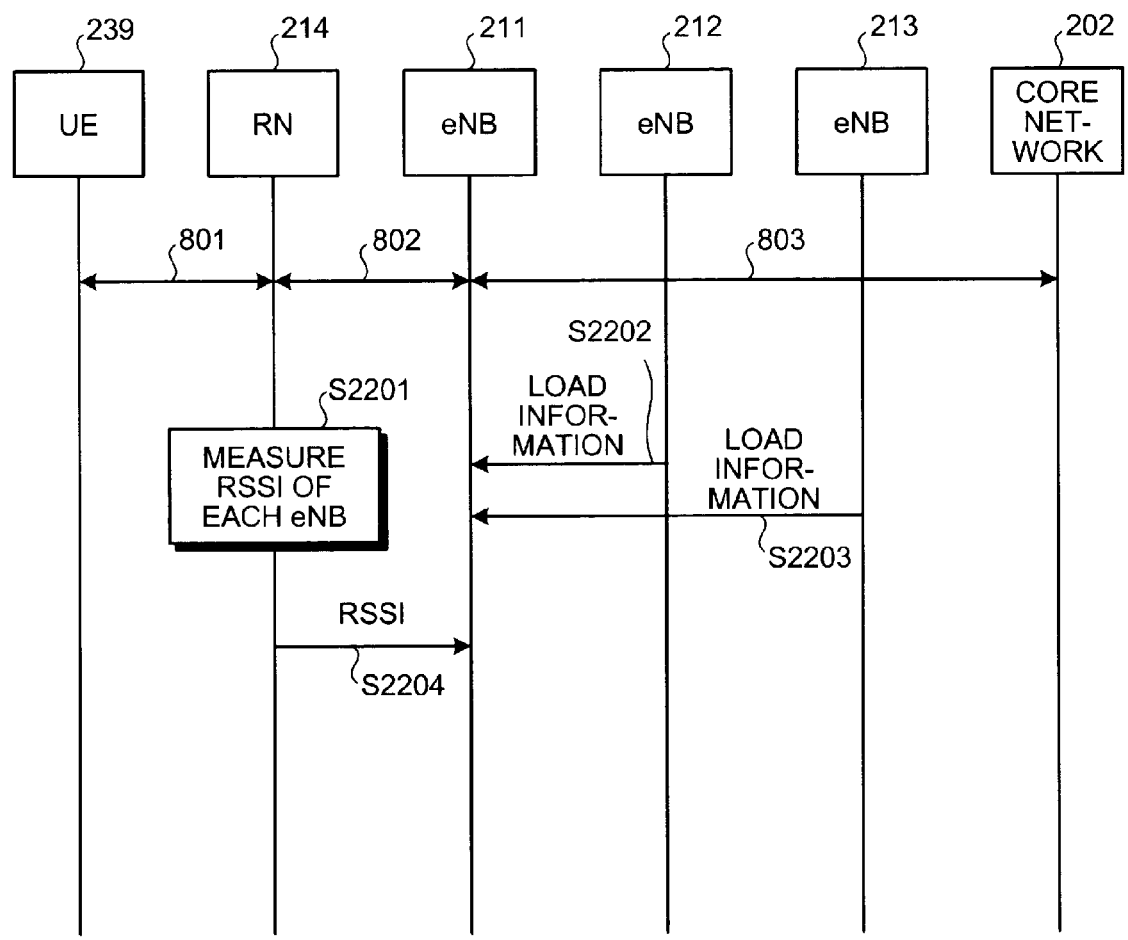

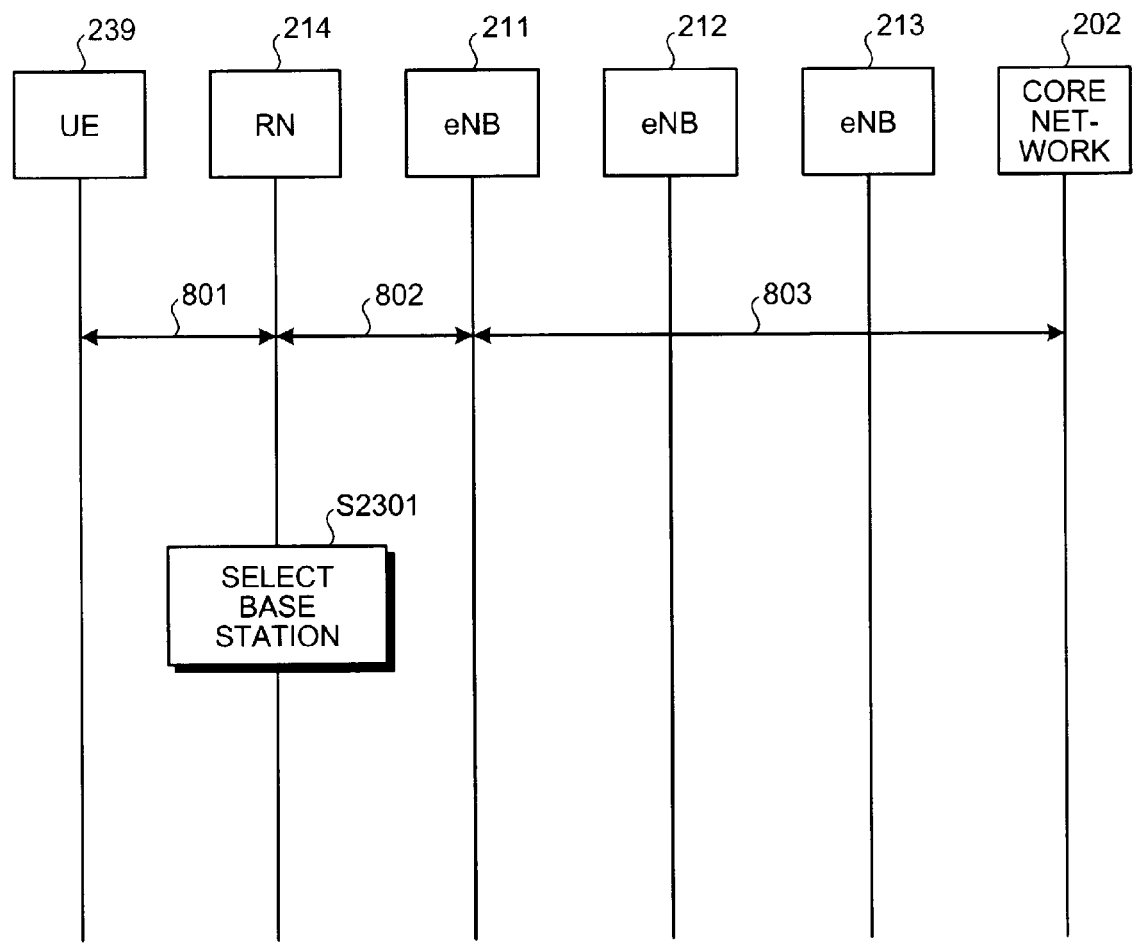

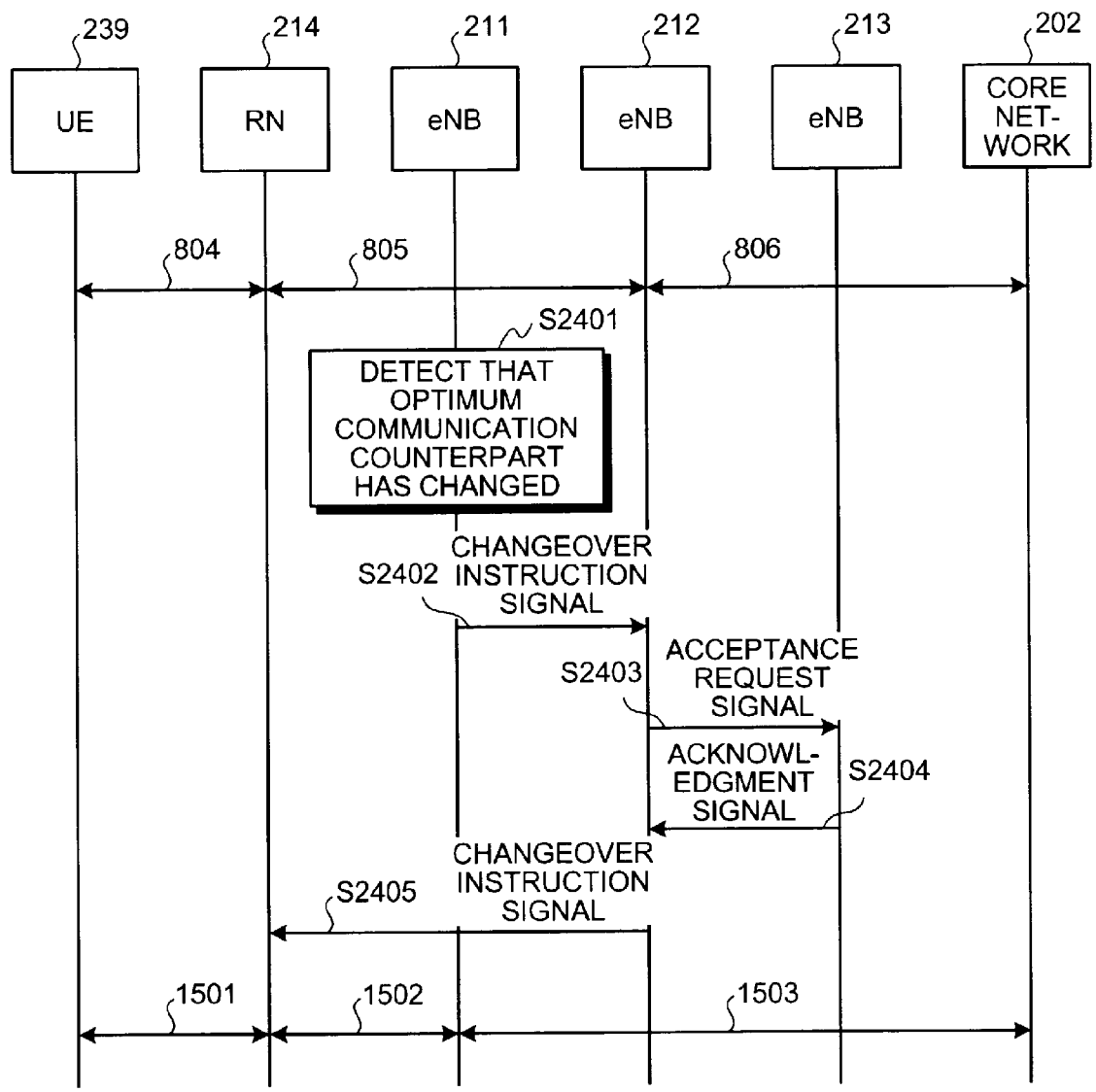

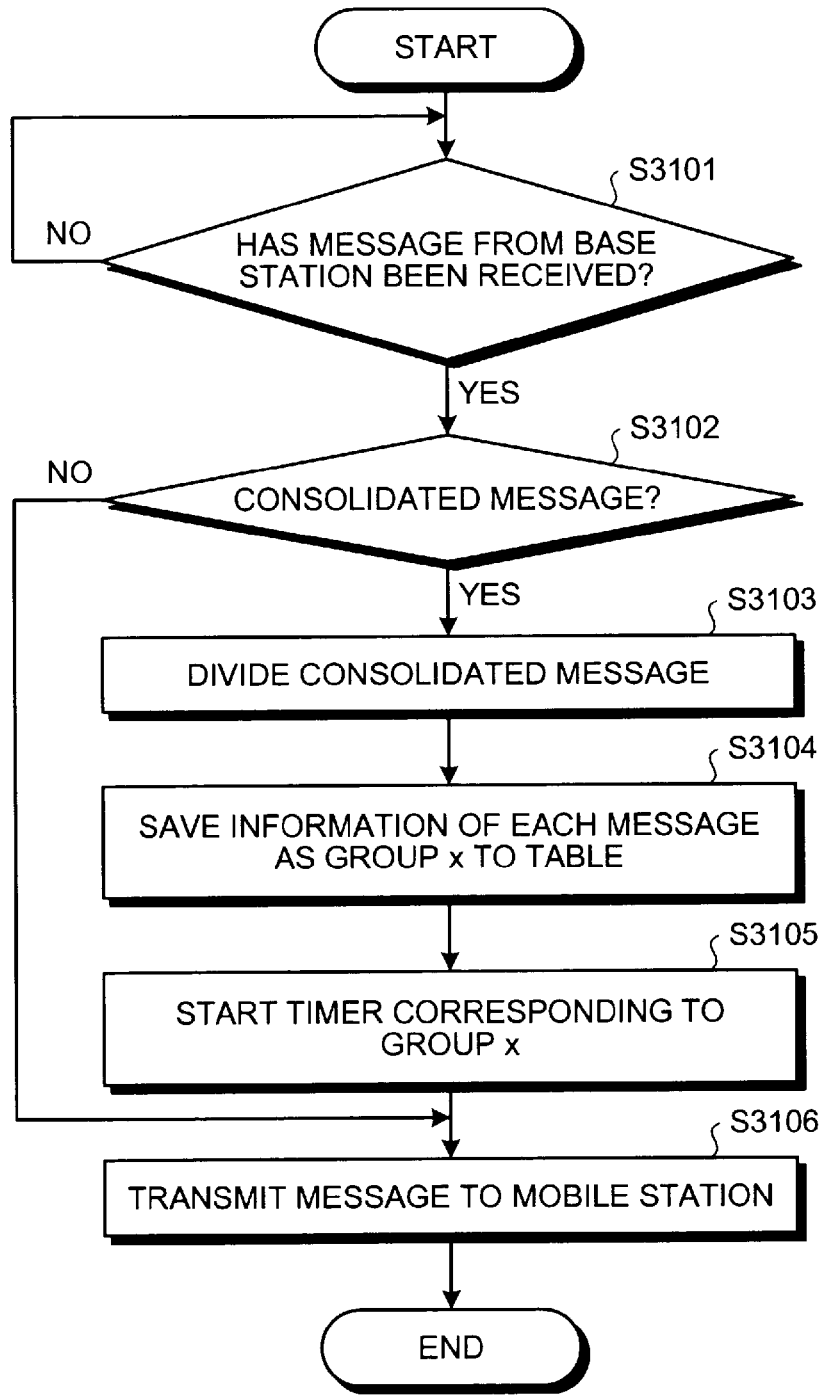

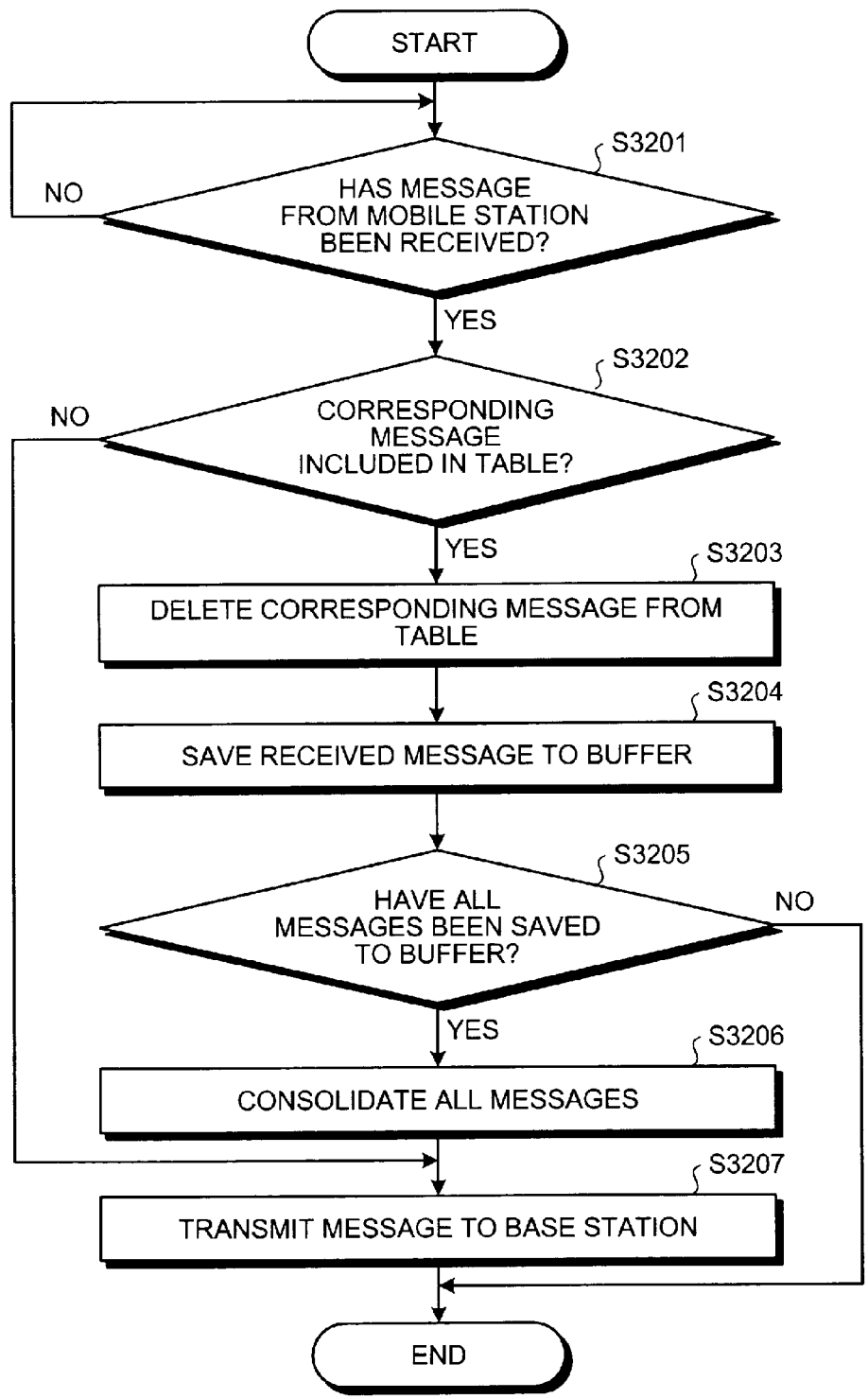

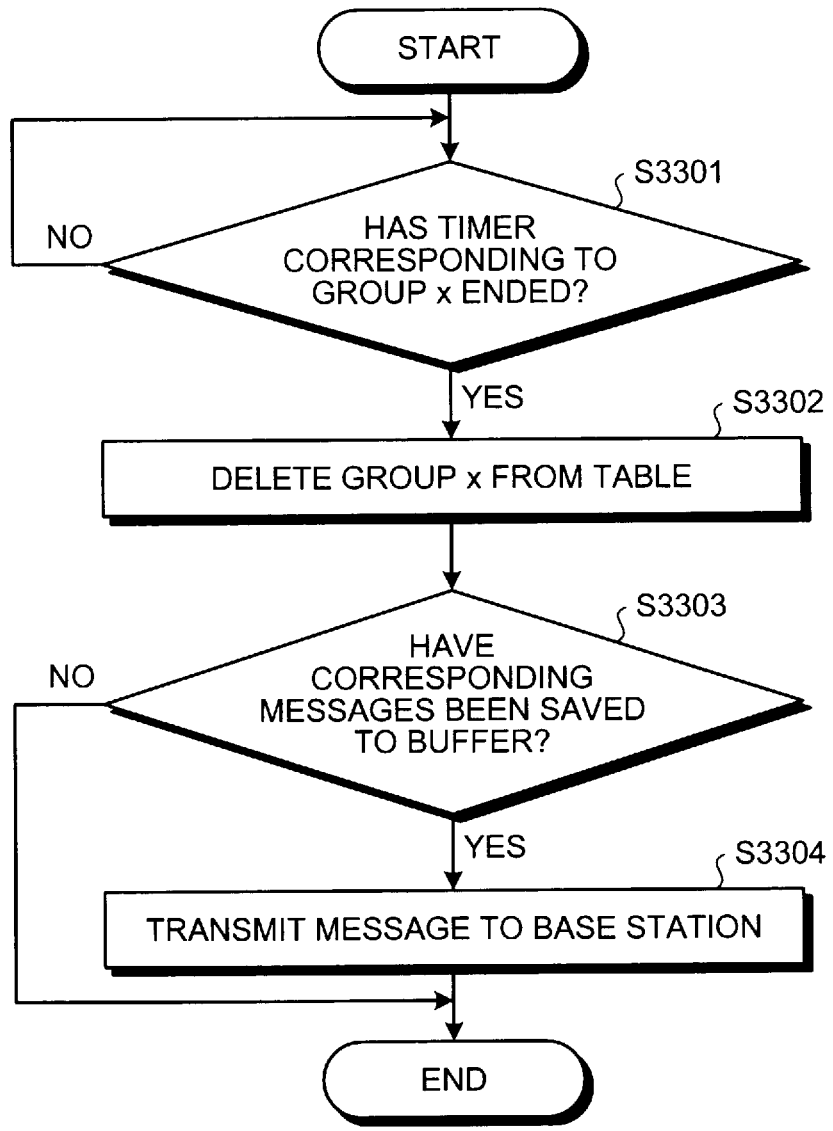

FIG.36
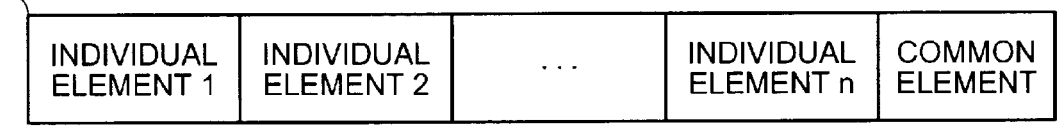
2910
2911          2912
FIG.37
3011          3012
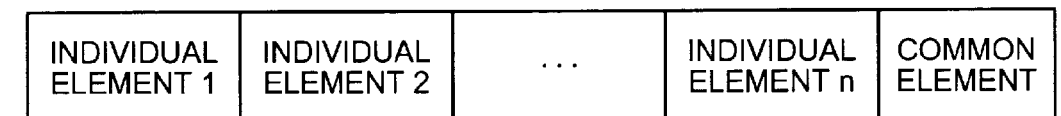
3010

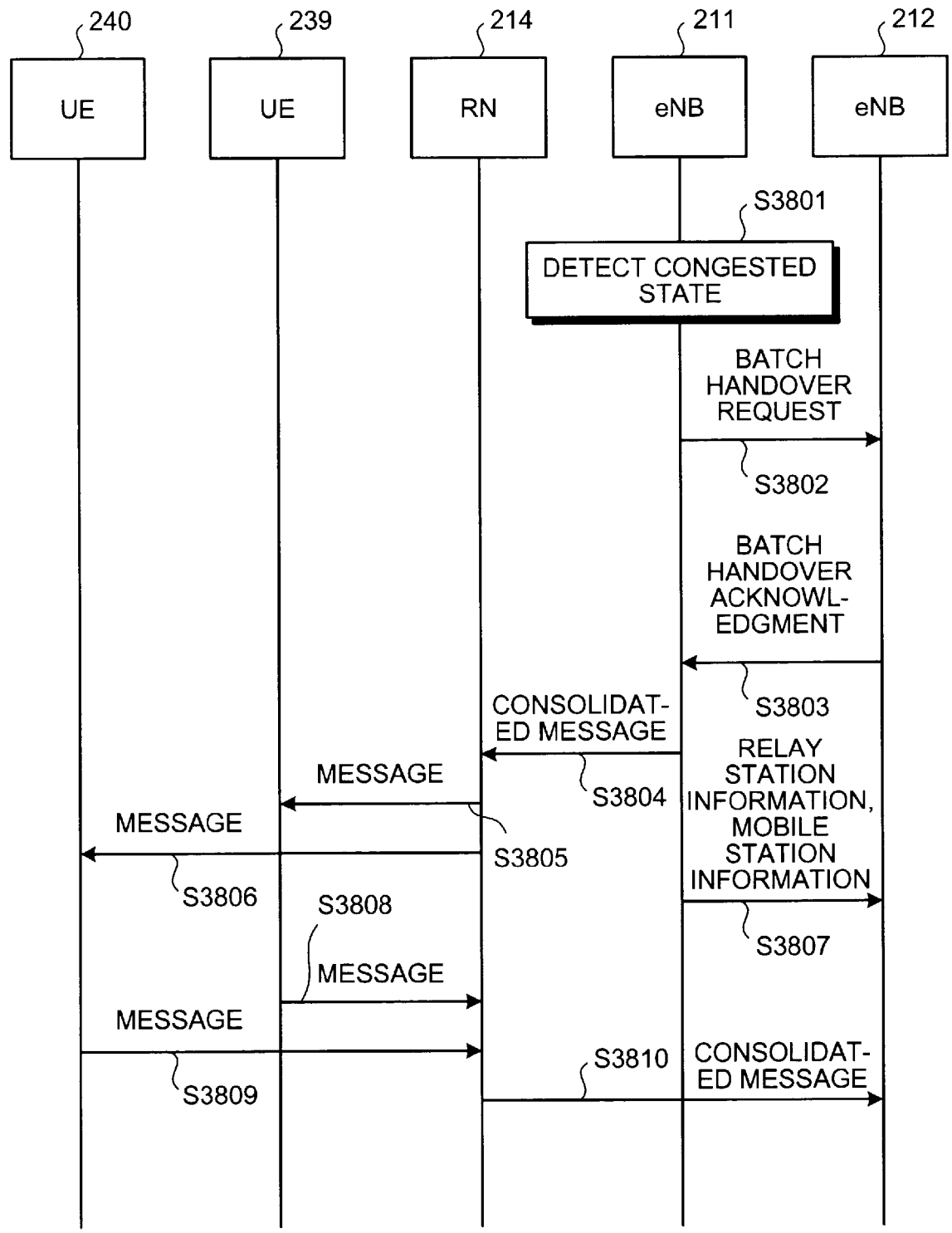

RELAY STATION, BASE STATION, MOBILE STATION, COMMUNICATION SYSTEM, AND COMMUNICATION METHOD

CROSS REFERENCE TO RELATED APPLICATIONS

This application is a continuation application of International Application PCT/JP2010/054151, filed on Mar. 11, 2010 and designating the U.S., the entire contents of which are incorporated herein by reference.

FIELD

The embodiments discussed herein are related to a relay station, a base station, a mobile station, a communication system, and a communication method for performing radio communication.

BACKGROUND

Relay stations (RN: Relay Node) studied under the 3rd Generation Partnership Project (3GPP) are constantly connected to a given base station (eNB: evolved-NodeB) (see, for example, 3GPP TR36.912 9.0.0 Chapter 9 "Relaying" and 3GPP TR36.806 "Relay Architectures for E-UTRA (LTE-Advanced)"). Therefore, load may concentrate at the given base station, exceeding the processing capability of the base station and causing a congested state of the base station.

At present, congestion control by the base station to deal with such a problem includes reducing through-put of data traffic by a Radio Resource Management (RRM) function, handing over a link to another base station, changing an audio codec, and cutting off a call of low priority (see, for example, 3GPP TS36.300 9.0.0 Chapter 16 "Radio Resource Management Aspects").

Conventional congestion control, however, may lead to lower service quality or failure in providing service. One conceivable method for preventing such a problem is to allow a relay station to change base stations. It is difficult for the relay station, however, to properly select a base station to which communication is to be switched when the base station currently communicating with the relay station enters a congested state. For example, when, as a communication counterpart, a base station is changed over to another base station, the other base station may be found to be in a congested state or the change over to the base station may cause the base station to enter a congested state. In such a case, base station changeover is carried out again, which causes a delay and leads to the deterioration of communication quality.

SUMMARY

According to an aspect of an embodiment, a relay station capable of communicating with a first base station, a second base station, and a mobile station, includes a relay unit configured to relay communication between the first base station and the mobile station; a receiving unit configured to receive load information concerning the second base station; and a changeover unit configured to change, from the first base station over to the second base station, a communication counterpart of the mobile station, communicating with the mobile station via the relay unit, the communication counterpart being changed based on the received load information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a sequence diagram of an example of phase P2 depicted in FIG. 8;

FIG. 12 is a sequence diagram of an example of phase P3 depicted in FIG. 8;

FIG. 13 is a sequence diagram of an first example of phase P4 depicted in FIG. 8;

FIG. 14 is a sequence diagram of a second example of phase P4 depicted in FIG. 8;

FIG. 15 is a sequence diagram of a modification of phase P4 depicted in FIG. 14;

FIGS. 17A and 17B are block diagrams of a communication system according to a second embodiment;

FIG. 18 is a block diagram of an example of the base station according to the second embodiment;

FIG. 20 is a flowchart of an example of operations of the first base station;

FIG. 21 is a flowchart of an example of operations of the relay station;

FIG. 22A is a sequence diagram of an example of phase P1 depicted in FIG. 8;

FIG. 23 is a sequence diagram of an example of phase P2 depicted in FIG. 8;

FIG. 24 is a sequence diagram of a modification of phase P4 according to the second embodiment;

FIG. 31 is a first flowchart of an example of handover operations of the relay station;

FIG. 32 is a second flowchart of the example of handover operations of the relay station;

FIG. 33 is a third flowchart of the example of handover operations of the relay station;

FIG. 34 depicts an example of a table managed by the relay station;

FIG. 35 depicts an example of a buffer managed by the relay station;

FIG. 36 depicts an example of a message transmitted from the base station to the mobile station;

FIG. 37 depicts an example of a message transmitted from the base station to the mobile station; and FIG. 38 is a sequence diagram of an example of handover operations according to the communication system.

DESCRIPTION OF EMBODIMENTS

Preferred embodiments of a relay station, a base station, a mobile station, a communication system, and a communication method will be explained with reference to the accompanying drawings. According to the relay station, the base station, the mobile station, the communication system, and the communication method, load information concerning communication and for a second base station that is different from a first base station is collected in advance, and when the first base station enters a congested state, etc., the second base station is selected as a new communication counterpart based on the load information. This process improves communication quality.

Figure 1A:
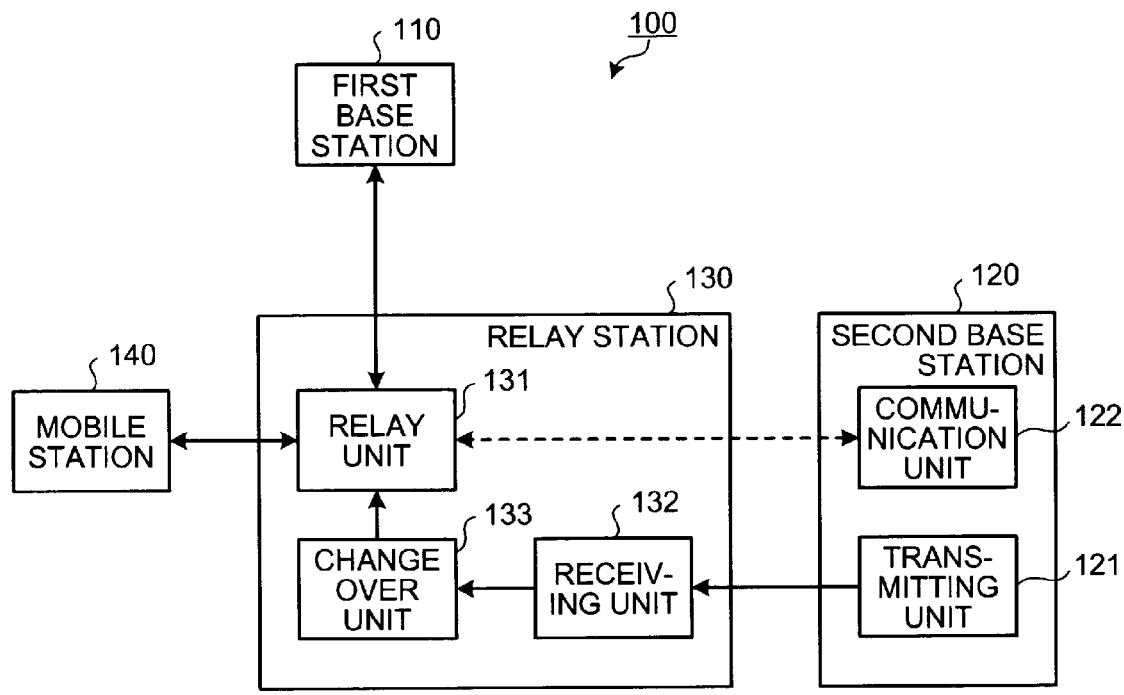
FIGS. 1A and 1B are block diagrams of a communication system according to a first embodiment.
Figure 1B:
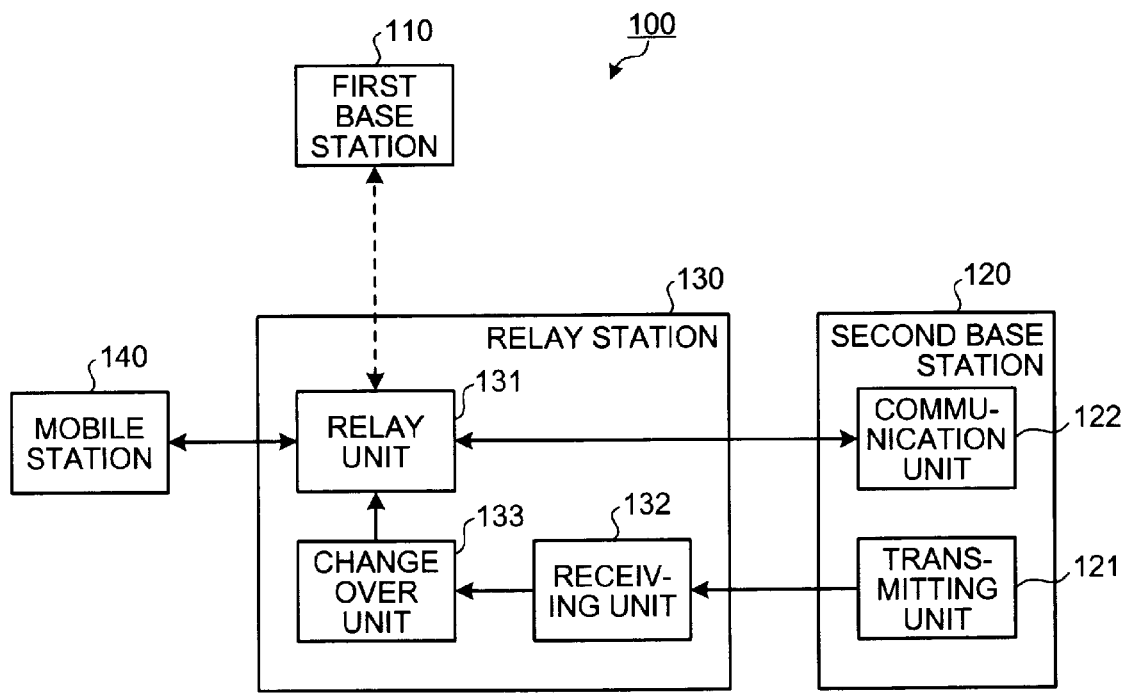

FIGS. 1A and 1B are block diagrams of a communication system according to a first embodiment. As depicted in FIG. 1A, a communication system 100 of the first embodiment includes a first base station 110, a second base station 120, a relay station 130, and a mobile station 140. In the communication system 100, the first base station 110 or the second base station 120 communicates with the mobile station 140 through relay by the relay station 130. According to the communication system 100, a communication counterpart of the mobile station 140 is changed from the first base station 110 over to the second base station 120.

The first base station 110 is a base station located in a vicinity of the relay station 130. The first base station 110 communicates with the mobile station 140 through relay by the relay station 130.

The second base station 120 is a base station located in a vicinity of the relay station 130. The second base station 120 communicates with the mobile station 140 through relay by the relay station 130. For example, the second base station 120 has a transmitting unit 121 and a communication unit 122.

The transmitting unit 121 transmits load information concerning the second base station 120 to the relay station 130. When the relay station 130 changes the communication counterpart of the mobile station 140 from the first base station 110 over to the second base station 120 based on the load information transmitted from the transmitting unit 121, the communication unit 122 starts communicating with the mobile station 140 through relay by the relay station 130.

Load information is, for example, information that indicates the amount of margin with respect to the load of processing by the second base station 120 (hereinafter "load margin"). For example, load information is information that indicates the load of processing by the relay station 130 and a given threshold. Load information may be information that indicates the difference of the load of processing by the second base station 120 and the given threshold. A load volume represents, for example, a data transfer volume (e.g., packet transfer volume).

The relay station 130 relays communication between the mobile station 140 and the first base station 110 and for communication between the mobile station 140 and the second base station 120. The relay station 130 changes the communication counterpart of the mobile station 140 from the first base station 110 over to the second base station 120, based on load information transmitted by the second base station 120. For example, the relay station 130 has a relay unit 131, a receiving unit 132, and a changeover unit 133.

The relay unit 131 relays communication between the first base station 110 and the mobile station 140. For example, the relay unit 131 receives uplink (UL) data from the mobile station 140 and transmits the received UL data to the first base station 110. The relay unit 131 receives downlink (DL) data from the first base station 110 and transmits the received DL data to the mobile station 140. As a result of communication changeover by the changeover unit 133, the relay unit 131 relays communication between the second base station 120 and the mobile station 140.

The receiving unit 132 receives load information concerning the second base station 120 located in a vicinity of the relay station 130. For example, the receiving station 132 receives the load information concerning the second base station 120 through radio communication from the second base station 120 by scanning radio channels used around the relay station 130. The receiving station 132 may receive the load information concerning the second base station 120 via the first base station 110. In this case, the first base station 110 receives the load information concerning the second base station 120 from the second base station 120 through wired communication, etc., and transmits the received load information to the relay station 130 through radio communication. The receiving unit 132 outputs the received load information to the changeover unit 133.

As depicted in FIG. 1B, the changeover unit 133 changes the communication counterpart of the mobile station 140 from the first base station 110 over to the second base station 120, based on load information output from the receiving unit 132. For example, when receiving a congestion notification signal indicating that the first base station 110 is in a congested state, the changeover unit 133 changes the communication counterpart of the mobile station 140. As another example, the changeover unit 133 changes the communication counterpart of the mobile station 140 when receiving a cell barring notification signal indicating that the first base station 110 is in a cell barring state.

The changeover unit 133 determines whether to change the communication counterpart of the mobile station 140 from the first base station 110 over to the second base station 120 based on, for example, the load indicated by the load information output from the receiving unit 132. For example, the changeover unit 133 carries out communication changeover when a marginal load volume of the second base station 120 indicated by the load information is greater than or equal to than a threshold.

In another example where the second base stations 120 are present in plural, the receiving unit 132 receives load information concerning the second base stations 120. Based on the load information received by the receiving unit 132, the changeover unit 133 selects a base station as a new communication counterpart from among the second base stations 120 and changes the communication counterpart of the mobile station 140 over to the selected base station.

When the relay station 130 changes the communication counterpart of the mobile station 140 from the first base station 110 over to the second base station 120 based on the load information concerning the second base station 120, the mobile station 140 continues communication by communicating with the second base station 120 through relay by the relay station 130. In this manner, when the first base station 110 currently communicating with the mobile station 140 enters a congested state or a cell barring state, the mobile station 140 can change the communication counterparts over to the second base station 120 without an interruption in communication.

Figure 2:
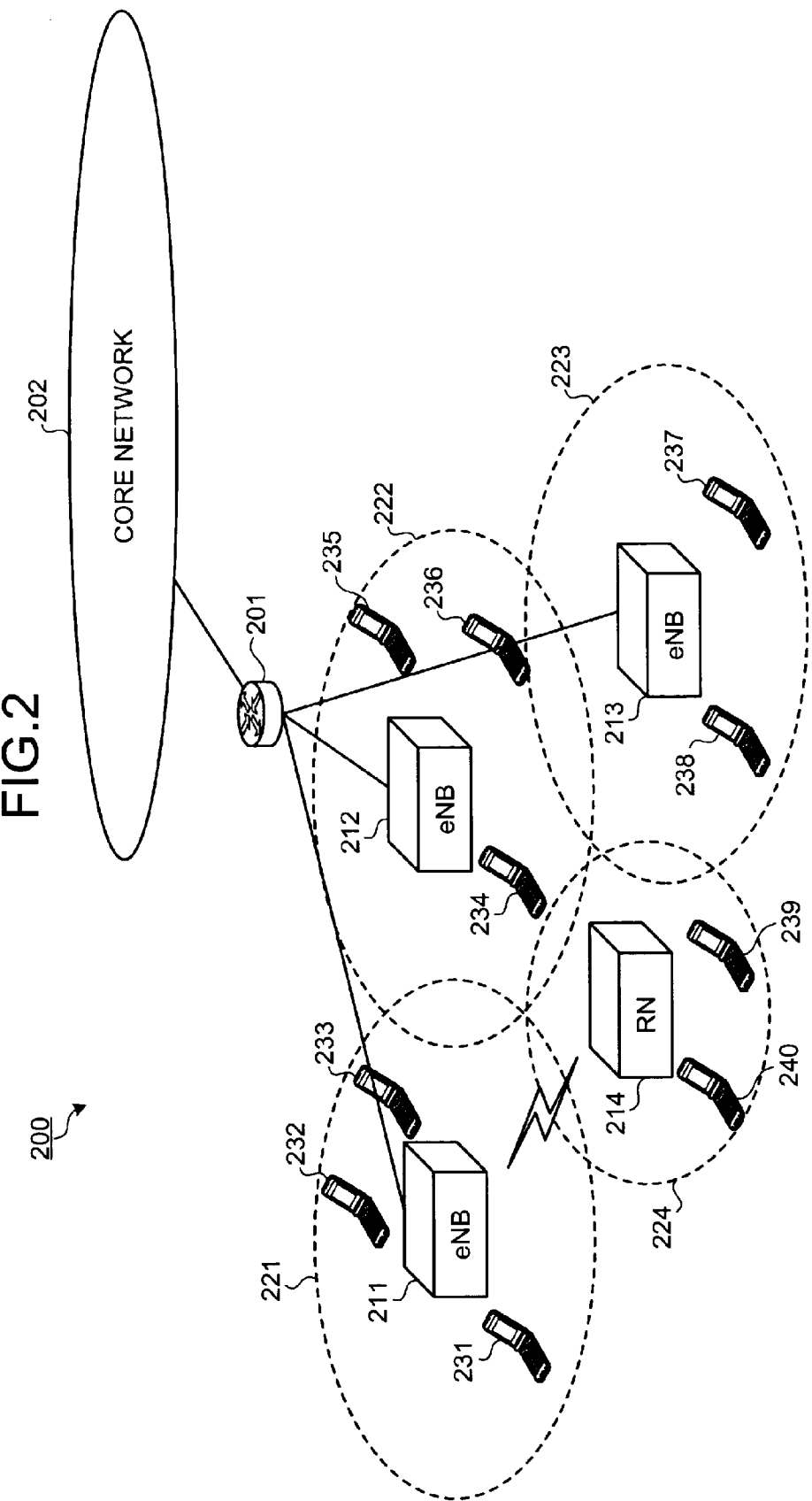
FIG. 2 depicts an example of the communication system depicted in FIGS. 1A and 1B.

FIG. 2 depicts an example of the communication system depicted in FIGS. 1A and 1B. A communication system 200 depicted in FIG. 2 includes base stations (eNB) 211 to 213, a relay station (RN) 214, and mobile stations (UE: User Equipment) 231 to 240. The base stations 211 to 213 are situated in a vicinity of the relay station 214 and are capable of radio communication with the relay station 214.

Cells 221 to 224 are the cells of the base stations 211 to 213 and the relay station 214, respectively. The base stations 211 to 213 are interconnected via a router 201, and are connected to a core network 202 via the router 201. The base stations 211 to 213 are connected to the router 201 via, for example, cables.

The relay station 214 relays communication between the mobile stations 239 and 240 in the cell 224 and the base station 211. In this case, the relay station 214, the base station 211, and the mobile stations 239 and 240 correspond to the relay station 130, the first base stations 110, and the mobile station 140 depicted in FIGS. 1A and 1B. The base stations 212 and 213 correspond to the second base station 120 depicted in FIGS. 1A and 1B. Hereinafter, communication between the base station 211 and the mobile station 239 will mainly be described, and this description applies also to communication between the base station 211 and the mobile station 240.

The base stations 212 and 213 each periodically transmit load information to the relay station 214. While relaying communication between the base station 211 and the mobile station 239, the relay station 214 receives pieces of load information from the base stations 212 and 213 and stores the received pieces of load information. When the base station 211 enters a congested state, the relay station 214 selects a base station as a new communication counterpart out of the base stations 212 and 213, based on the stored pieces of load information, and changes the communication counterpart of the mobile station 239 over to the selected base station.

For example, when selecting the base station 212 as the new communication counterpart, the relay station 214 carries out a changeover process of changing the communication counterpart of the mobile station 239 from the base station 211 over to the base station 212. As a result, communication between the base station 211 and the mobile station 239 is cut off as communication between the base station 212 and the mobile station 239 is carried out as continuous communication through relay by the relay station 214.

The above case is described as a case where the communication counterpart of the mobile station 239 is changed when the base station 211 enters a congested state. However, the changing of the communication counterpart of the mobile station 239 is not limited to when the base station 211 is in a congested state. The communication counterpart of the mobile station 239 may also be changed, for example, when the base station 211 is in a cell barring state.

Here, an example will be described where the relay station 214 is an "L3 relaying" type (see, e.g., the above non-patent literature 2) and the mobile stations 239 and 240 recognize the relay station 214 as an eNB. In this case, the mobile stations 239 and 240 do not realize that the communication counterparts have been changed from the base station 211 over to the base station 212.

Figure 3:
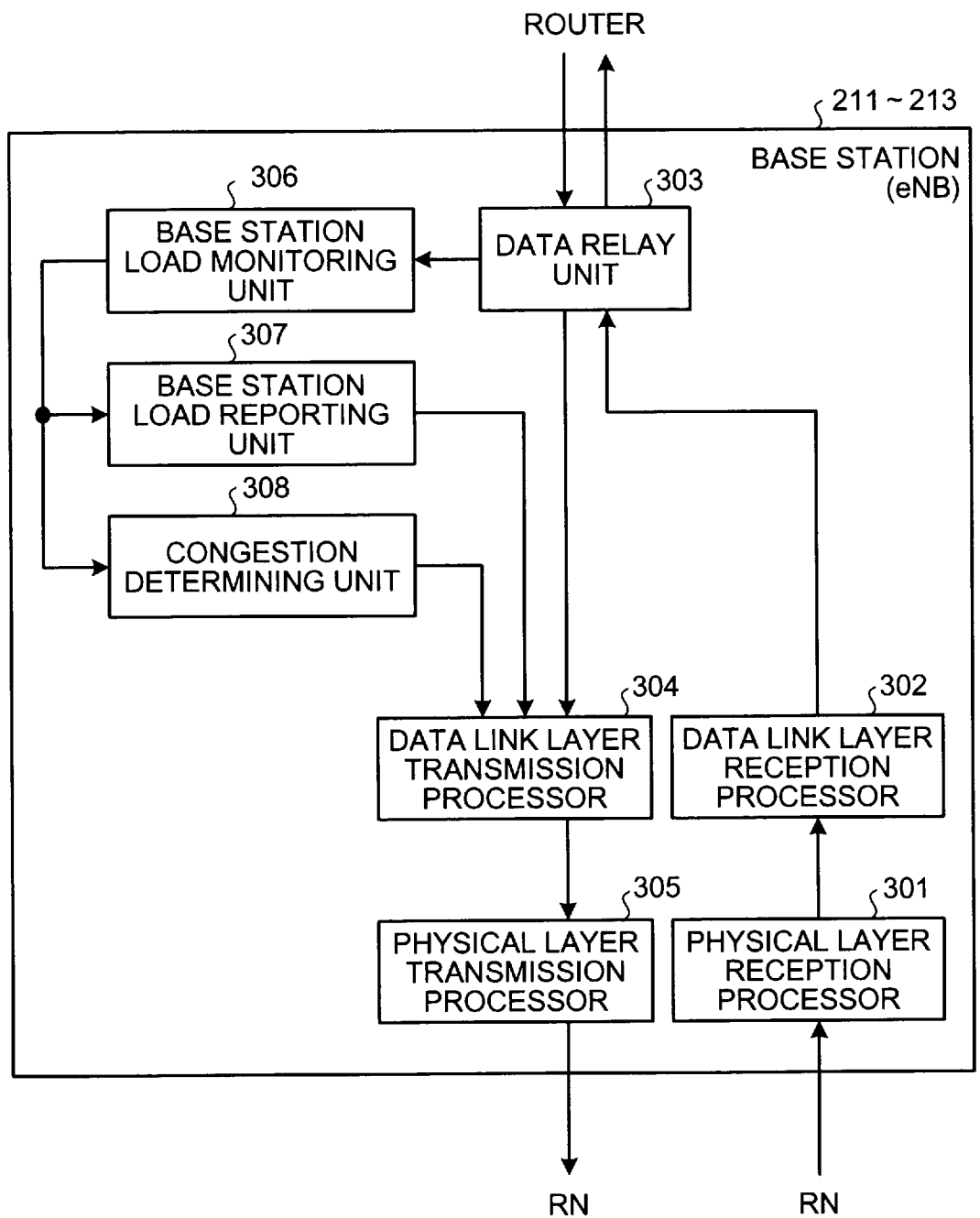
FIG. 3 is a block diagram of an example of a base station according to the first embodiment.

FIG. 3 is a block diagram of an example of the base station according to the first embodiment. With reference to FIG. 3, an example will be described where each of the base stations 211 to 213 combines both functions of the first base station 110 and the second base station 120. As depicted in FIG. 3, each of the base stations 211 to 213 includes a physical layer reception processor 301, a data link layer reception processor 302, a data relay unit 303, a data link layer transmission processor 304, a physical layer transmission processor 305, a base station load monitoring unit 306, a base station load reporting unit 307, and a congestion determining unit 308.

The physical layer reception processor 301 receives a signal transmitted from the relay station (RN) 214 and carries out a reception process on the physical layer of the received signal. For example, the physical layer reception processor 301 carries out the reception process on UL data from the mobile station 239 that is transmitted from the relay station 214. The physical layer reception processor 301 outputs the signal subjected to the reception process to the data link layer reception processor 302. The data link layer reception processor 302 carries out a reception process on the data link layer of the signal output from the physical layer reception processor 301, and outputs the signal subjected to the reception process to the data relay unit 303.

The data relay unit 303 carries out a relay process for communication between the core network 202 and the mobile station 239. For example, the data relay unit 303 transfers UL data from the mobile station 239 that is output from the data link layer reception processor 302, to the router 201. The UL data transferred to the router 201 is further transferred by the router 201 to the core network 202. The data relay unit 303 outputs to the data link layer transmission processor 304, DL data destined for the mobile station 239 and transferred from the core network 202 to the data relay unit 303 via the router 201.

The data link layer transmission processor 304 carries out a transmission process on the data link layer of a signal to be transmitted to the relay station 214, and outputs the signal subjected to the transmission process to the physical layer transmission processor 305. For example, the data link layer transmission processor 304 carries out a transmission process on DL data destined for the mobile station 239 that is output from the relay unit 303. The data link layer transmission processor 304 also carries out a transmission process on load information output from the base station load reporting unit 307.

The data link layer transmission processor 304 carries out a transmission process on a congestion notification signal or cell barring notification signal output from the congestion determining unit 308. The physical layer transmission processor 305 carries out a transmission process on the physical layer of a signal output from the data link layer transmission processor 304, and transmits the signal subjected to the transmission process to the relay station (RN) 214.

The base station load monitoring unit 306 monitors the load volume of communication by the data relay unit 303. The load volume monitored by the base station load monitoring unit 306 represents, for example, a data transfer volume at the data relay unit 303. The base station load monitoring unit 306 reports the load volume obtained as a monitored value to the base station load reporting unit 307 and to the congestion determining unit 308.

The base station load reporting unit 307 outputs to the data link layer transmission processor 304, load information including information that indicates the load volume reported by the base station load monitoring unit 306 and information that indicates a given threshold. The load information output from the base station load reporting unit 307 to the data link layer transmission processor 304 is transmitted to the relay station 214. For example, the load information is delivered to the nearby devices by the physical layer transmission processor 305 through radio communication. The load information may be transferred by the physical layer transmission processor 305 to a base station communicating with the relay station 214, transmitted from the base station to the relay station 214 through radio communication.

The congestion determining unit 308 determines whether the base station is in a congested state, based on a load volume reported by the base station load monitoring unit 306. For example, the congestion determining unit 308 compares the load volume reported by the base station load monitoring unit 306 with a given threshold. The congestion determining unit 308 determines that the base station is not in a congested state when the load volume does not exceed the threshold, and determines that the base station is in a congested state when the load volume exceeds the threshold. When determining that the base station is in the congested state, the congestion determining unit 308 outputs to the data link layer transmission processor 304, a congestion notification signal that indicates that the base station is in a congested state. The congestion notification signal output from the congestion determining unit 308 to the data link layer transmission processor 304 is transmitted to the relay station 214 communicating with the base station.

When the base station enters a cell barring state, the congestion determining unit 308 outputs a cell barring notification signal that indicates that the base station is in a cell barring state to the data link layer transmission processor 304. The cell barring notification signal output from the congestion determining unit 308 to the data link layer transmission processor 304 is transmitted to the relay station 214 communicating with the base station.

Figure 4:
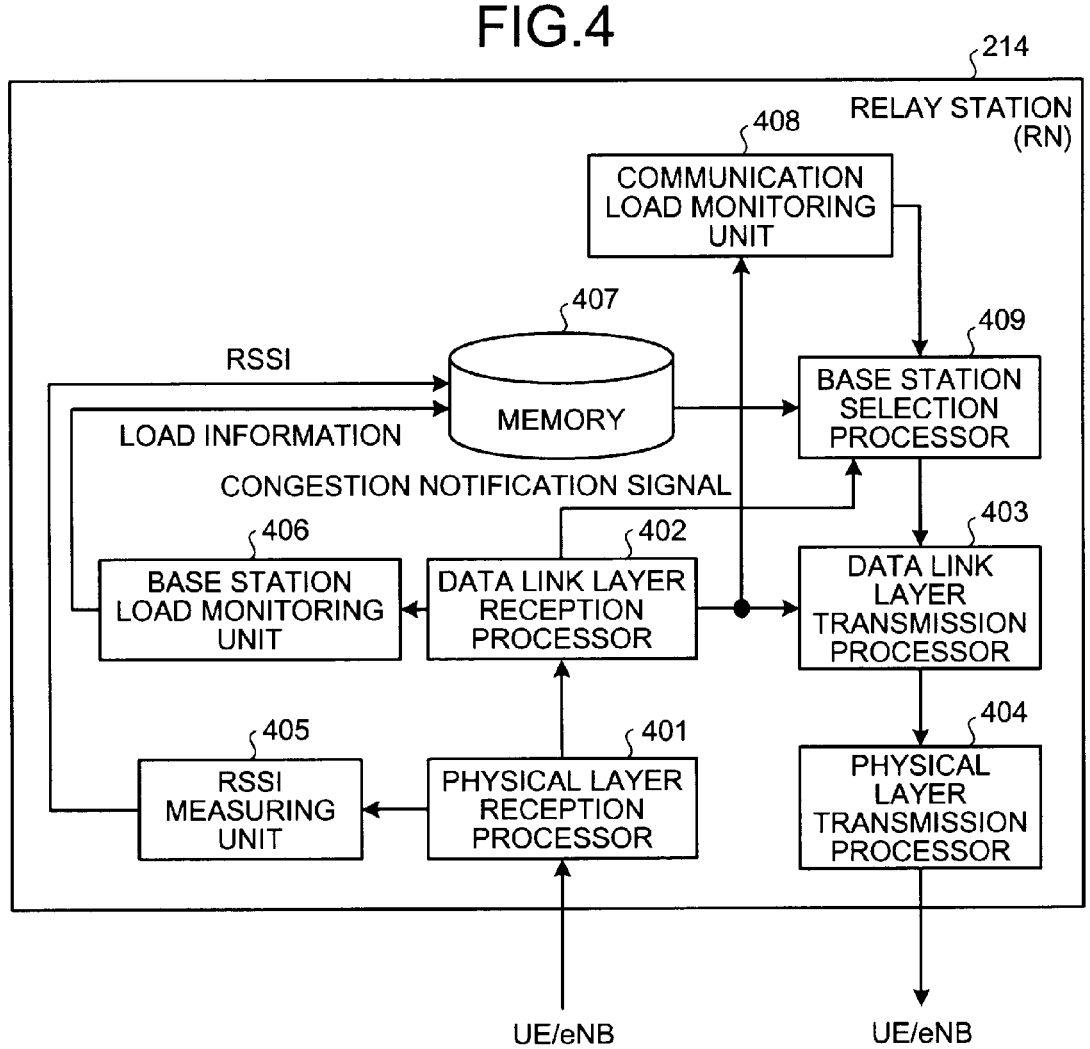
FIG. 4 is a block diagram of an example of a relay station according to the first embodiment.

FIG. 4 is a block diagram of an example of the relay station according to the first embodiment. As depicted in FIG. 4, the relay station 214 includes a physical layer reception processor 401, a data link layer reception processor 402, a data link layer transmission processor 403, a physical layer transmission processor 404, an RSSI measuring unit 405, a base station load monitoring unit 406, a memory 407, a communication load monitoring unit 408, and a base station selection processor 409.

The physical layer reception processor 401 receives signals transmitted from the mobile stations (EU) 239 and 240 and the base stations (eNB) 211 to 213 and carries out a reception process on the physical layers of the received signals. For example, the physical layer reception processor 401 carries out a reception process on the load information transmitted from the base stations 211 to 213. The physical layer reception processor 401 also carries out a reception process on the UL data from the mobile stations 239 and 240. The physical layer reception processor 401 outputs to the data link layer reception processor 402 and to the RSSI measuring unit 405, the signal subjected to the reception process.

The data link layer reception processor 402 carries out a reception process on the data link layer of a signal output from the physical layer reception processor 401, and outputs the signal subjected to the reception process to the base station load monitoring unit 406 and to the data link layer transmission processor 403. The data link layer reception processor 402 obtains a congestion notification signal or cell barring notification signal included in the signal subjected to the reception process, and outputs the obtained congestion notification signal or cell barring notification signal to the base station selection processor 409.

The data link layer transmission processor 403 carries out a transmission process on the data link layer of a signal to be transmitted to the base stations 211 to 213 or the mobile stations 239 and 240, and outputs the signal subjected to the transmission process to the physical layer transmission processor 404. The physical layer transmission processor 404 carries out a transmission process on the physical layer of the signal output from the data link layer transmission processor 403, and outputs the signal subjected to the transmission process to the mobile stations (UE) 239 and 240 or the base stations (eNB) 211 to 213.

The RSSI measuring unit 405 measures a received signal strength indicator (RSSI) based on a signal output from the physical layer reception processor 401. For example, the RSSI measuring unit 405 measures each RSSI based on signals from the base stations 211 to 213. The RSSI measuring unit 405 outputs the RSSIs to the memory 407.

The base station load monitoring unit 406 monitors a signal output from the data link layer reception processor 402, and obtains load information that is included in the signal and from the base stations 212 and 213. The base station load monitoring unit 406 outputs the obtained load information to the memory 407. The memory 407 stores the RSSI output from the RSSI measuring unit 405 and also stores the load information output from the base station load monitoring unit 406.

The communication load monitoring unit 408 monitors the relay communication load volume of the data link layer reception processor 402 and the data link layer transmission processor 403. For example, the communication load monitoring unit 408 monitors a data transfer volume of data transfer from the data link layer reception processor 402 to the data link layer transmission processor 403. The communication load monitoring unit 408 reports the load volume obtained as a monitored value to the base station selection processor 409.

When the data link layer reception processor 402 outputs a congestion notification signal or a cell barring notification signal, the base station selection processor 409 selects a base station as a new communication counterpart. The selection of a base station as a new communication counterpart by the base station selection processor 409 will be described later. The base station selection processor 409 outputs to the data link layer transmission processor 403, base station information that indicates the selected base station. The base station information output to the data link layer transmission processor 403 is transmitted by the physical layer transmission processor 404 to the base station 211.

When the base station information is transmitted to the base station 211, the base station 211 transmits a changeover instruction signal instructing changeover of a communication counterpart to the base station indicated by the base station information. In response to the changeover instruction signal, the data link layer reception processor 402 and the data link layer transmission processor 403 change the communication counterpart of the mobile station 239 over to the base station indicated by the base station information.

In this manner, when the base station 211 enters a congested state, the communication counterpart of the mobile station 239 can be changed over to the base station 212 or base station 213. At this time, the communication counterpart of the mobile station 239 can be selected based on load information concerning the base stations 212 and 213. A base station, therefore, can be selected as a new communication counterpart according to the marginal load volumes of the base stations 212 and 213.

In this manner, the relay station has a transmitting unit (the data link layer transmission processor 403 and the physical layer transmission processor 404) that transmits to the base station 211, base station information that indicates the new base-station communication counterpart; and the relay station changes the communication counterpart of the mobile station 239 by control of the base station 211, based on the base station information received. In this manner, the communication counterpart of the mobile station 239 can be changed over to a base station selected by the relay station 214.

The base station selection processor 409 selects a base station as a new communication counterpart, based on load information stored in the memory 407. For example, the base station selection processor 409 selects the base station having the largest marginal load volume among the base stations 212 and 213, based on the load information.

The base station selection processor 409 may select a base station as a new communication counterpart, based on load information stored in the memory 407 and a load volume reported by the communication load monitoring unit 408. For example, it is assumed that the load information includes a load volume and a given threshold. The base station selection processor 409 calculates the sum of the load volume indicated by the load information and the load volume reported by the communication load monitoring unit 408. The base station selection processor 409 compares the calculated sum of the load volumes and the threshold indicated by the load information, and changes the communication counterpart of the mobile station 239 over to a base station that is among the base stations 212 and 213 and for which the sum of the load volumes less than or equal to the threshold.

In this manner, load volumes of the base stations 212 and 213 expected to result when a communication counterpart of the mobile station 239 is changed over to the base stations 212 and 213 are calculated based on a monitoring result from the communication load monitoring unit 408 and load information, and the communication counterpart of the mobile station 239 is changed based on the result of this calculation. This ensures that when the communication counterpart of the mobile station 239 is changed, the base station as the new communication counterpart does not enter a congested state.

The base station selection processor 409 may select, as a new communication counterpart, a base station for which the sum of load volumes is less than or equal to the threshold and having the largest RSSI the stored in the memory 407, among the base stations 212 and 213. In this manner, the communication counterpart of the mobile station 239 is changed based on RSSIs of the base stations 212 and 213, a monitoring result from the communication load monitoring unit 408, and load information. This ensures that when the communication counterpart of the mobile station 239 is changed, a base station as a new communication counterpart does not enter a congested state and that the communication counterpart of the mobile station 239 is changed over to a base station having a larger RSSI. As a result, communication quality is improved.

Figure 5:
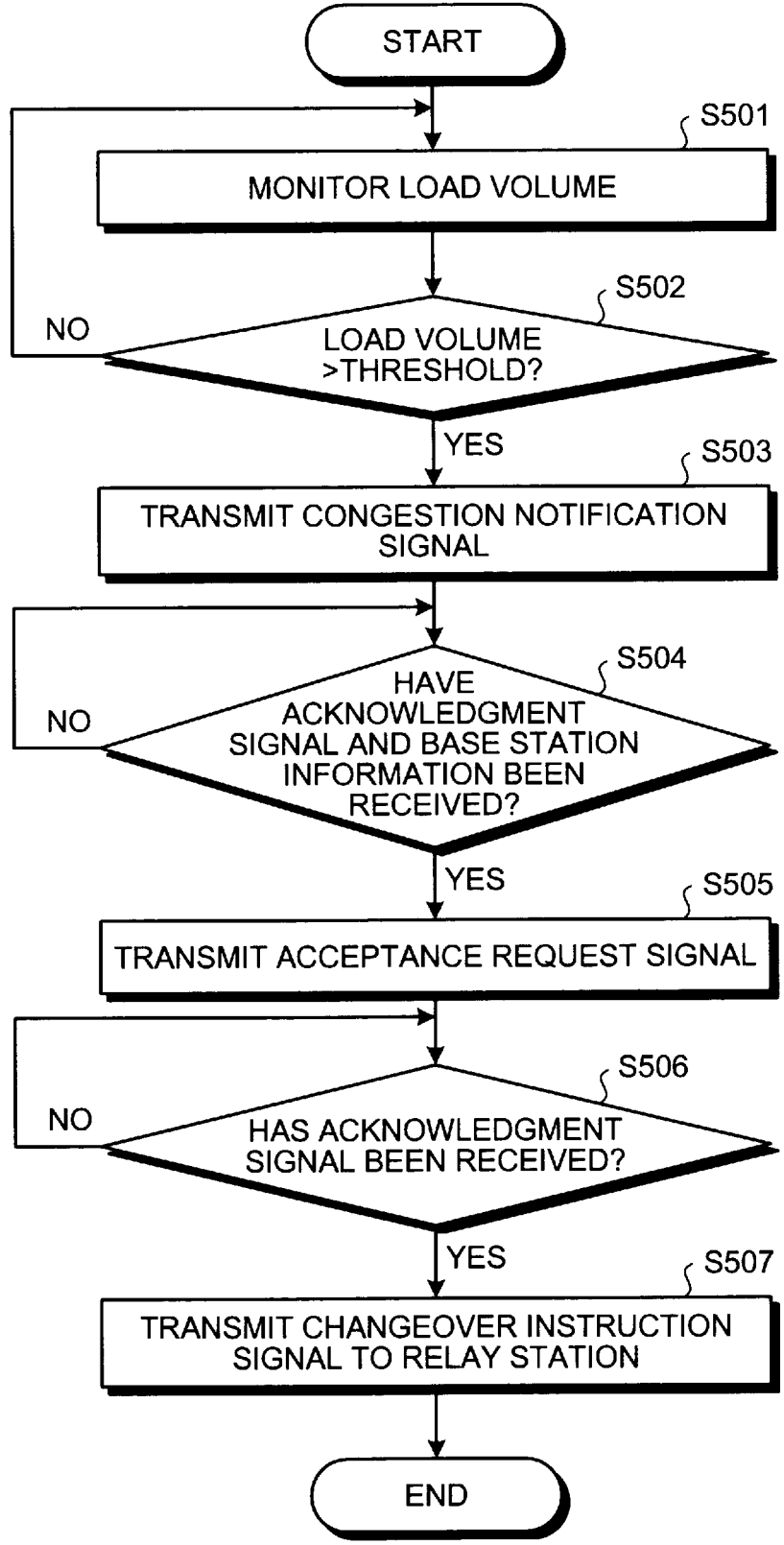
FIG. 5 is a flowchart of an example of operations of a first base station.

FIG. 5 is a flowchart of an example of operations of the first base station. With reference to FIG. 5, operations of the base station 211 (first base station) communicating with the mobile station 239 before communication changeover by the relay station 214 will be described. The base station 211 executes, for example, each of the following steps. The base station 211 monitors the load volume of the base station 211 (data relay unit 303) (step S501).

The base station 211 determines whether the load volume monitored at step S501 exceeds a threshold (step S502). If the load volume does not exceed the threshold (step S502: NO), the base station 211 returns to step S501. If the load volume exceeds the threshold (step S502: YES), the base station 211 transmits a congestion notification signal to the relay station 214 (step S503).

The base station 211 determines whether an acknowledgment signal in response to the congestion notification signal transmitted at step S503 and base station information have been received from the relay station 214 (step S504), and stands by until the acknowledgment signal and base station information have been received (step S504: NO). When the acknowledgment signal and base station information have been received (step S504: YES), the base station 211 transmits an acceptance request signal to a base station as a new communication counterpart indicated by the base station information (step S505).

The base station 211 determines whether an acknowledgment signal in response to the acceptance request signal transmitted at step S505 has been received (step S506), and stands by until the acknowledgment signal has been received (step S506: NO). When the acceptance acknowledgment signal has been received (step S506: YES), the base station 211 transmits a changeover instruction signal to the relay station 214 (step S507), and ends the series of operations.

When the changeover instruction signal is received from the base station 211, the relay station 214 changes the communication counterpart of the mobile station 239 from the base station 211 over to the base station 212 or base station 213. In this manner, when the base station 211 enters a congested state, the communication counterpart of the mobile station 239 can be changed from the base station 211 over to the base station 212 or base station 213.

Following step S506, the base station 211 may transmit to the base station 212, relay station information that indicates the relay station 214 and mobile station information that indicates the mobile station 239, thereby allowing the base station 212 to start communicating with the mobile station 239 through relay by the relay station 214, based on the relay station information and mobile station information received from the base station 211.

The operations carried out at steps S501 to S503 are described as operations such that when the base station 211 enters a congested state, the base station 211 transmits a congestion notification signal to the relay station 214. The operations at steps S501 to S503 may be replaced with operations such that when the base station 211 enters a cell barring state, the base station 211 transmits a cell barring notification signal to the relay station 214.

Figure 6:
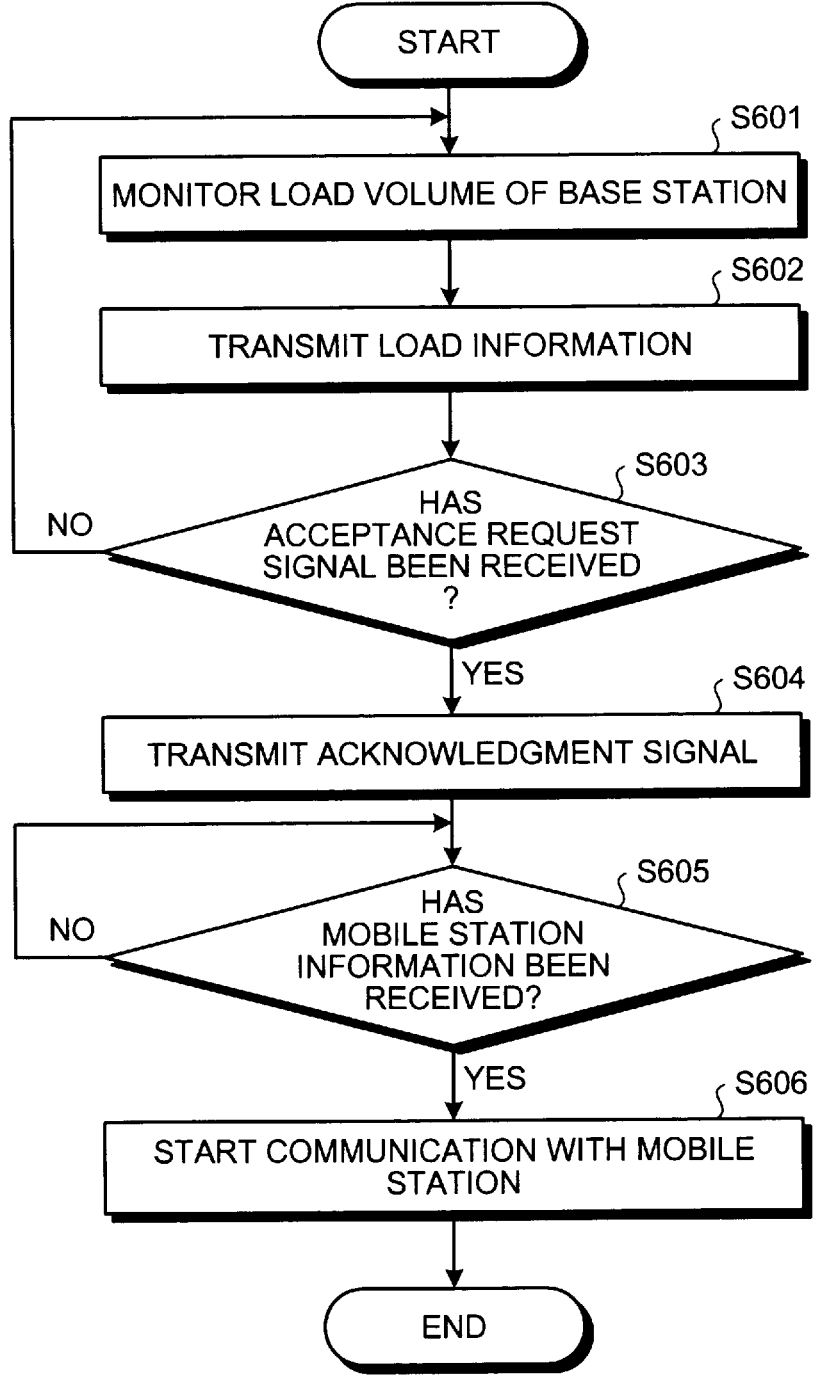
FIG. 6 is a flowchart of an example of operations of a second base station.

FIG. 6 is a flowchart of an example of operations of the second base station. With reference to FIG. 6, operations of the base station 212 (second base station) communicating with the mobile station 239 following communication changeover by the relay station 214 will be described. Although the operations are described with respect to the base station 212, the operations of the base station 213 are identical. The base station 212 executes, for example, each of the following steps. The base station 212 first monitors the load volume of the base station 212 (data relay unit 303) (step S601).

The base station 212 transmits to the relay station 214, load information that indicates the load volume monitored at step S601 (step S602). The base station 212 determines whether an acceptance request signal has been received from the base station 211 (step S603), and stands by until an acceptance request signal has been received (step S603: NO). When an acceptance request signal has been received (step S603: YES), the base station 212 transmits an acknowledgment signal in response to the acceptance request signal to the base station 211 (step S604).

The base station 212 determines whether mobile station information has been received from the base station 211 (step S605), and stands by until mobile station information has been received (step S605: NO). When mobile station information has been received (step S605: YES), the base station 212 starts communicating with the mobile station indicated by the received mobile station information, through relay by the relay station 214 (step S606), and ends the series of operations. In this manner, the base station 212 periodically transmits the load information concerning the base station 212 to the relay station 214. In addition, upon receiving from the base station 211, the acceptance request signal requesting acceptance of the mobile station 239, the base station 212 starts communicating with the mobile station 239 through relay by the relay station 214.

Figure 7:
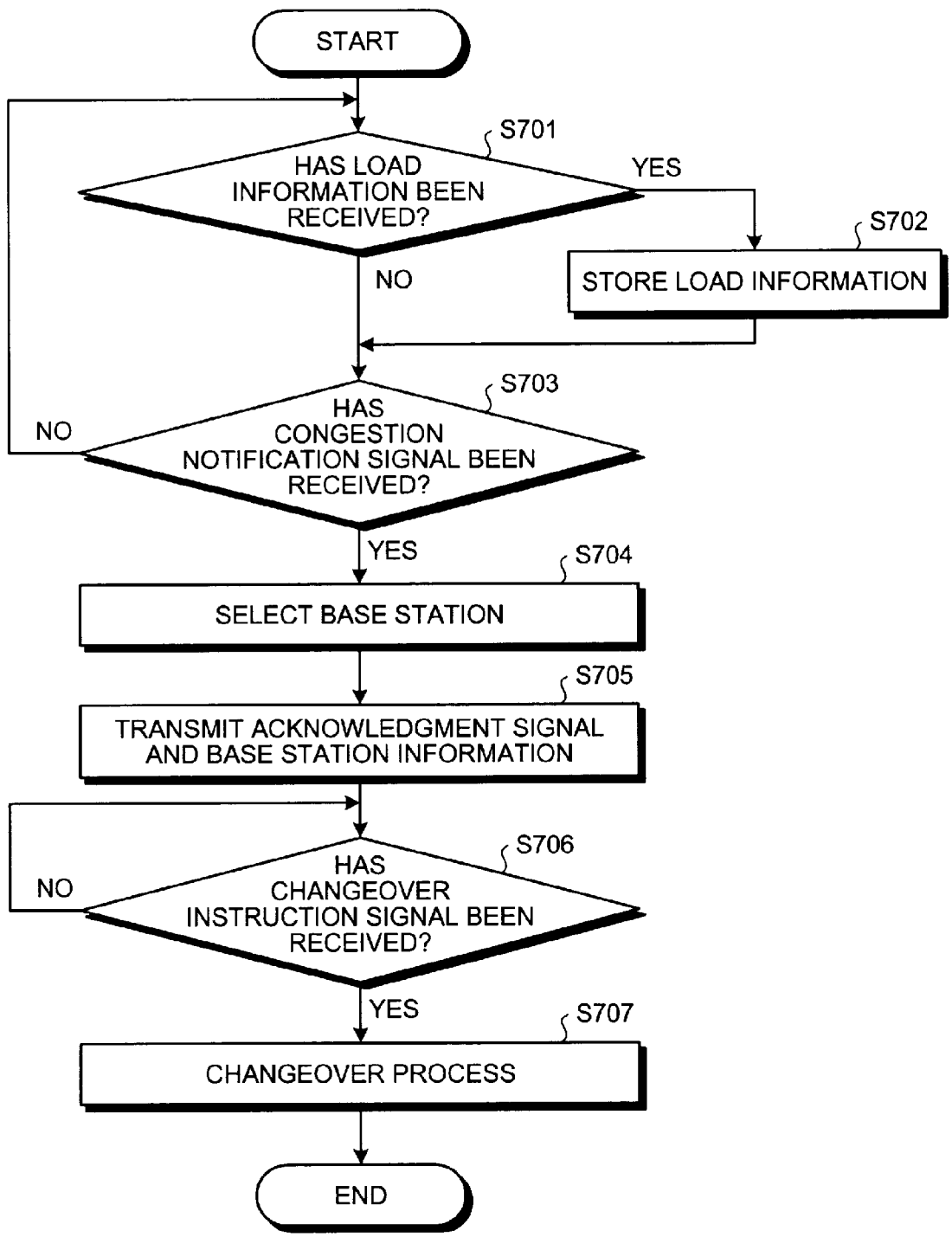
FIG. 7 is a flowchart of an example of operations of the relay station.

FIG. 7 is a flowchart of an example of operations of the relay station. The relay station 214 executes, for example, each of the following steps. The relay station 214 first determines whether load information has been received from the base stations 212 and 213 (step S701). If load information has been received (step S701: YES), the relay station 214 stores the received load information (step S702), and proceeds to step S703.

If load information has been received at step S701 (step S701: NO), the relay station 214 determines whether a congestion notification signal (or a cell barring notification signal) has been received from the base stations 211 (step S703). If a congestion notification signal has not been received (step S703: NO), the relay station 214 returns to step S701. If a congestion notification signal has been received (step S703: YES), the relay station 214 selects a base station as a new communication counterpart from among the base stations 212 and 213, based on the load information stored at step S702 (step S704).

The relay station 214 transmits to the base station 211, an acknowledgment signal in response to the congestion notification signal (or the cell barring signal) received at step S703 and base station information that indicates the base station selected at step S704 (step S705). The relay station 214 determines whether a changeover instruction signal has been received from the base station 211 (step S706), and stands by until a changeover instruction signal has been received (step S706: NO).

When a changeover instruction signal has been received at step S706 (step S706: YES), the relay station 214 carries out a changeover process of changing the communication counterpart of the mobile station 239 over to the base station selected at step S704 (step S707), and ends the series of operations. In this manner, the relay station 214 collects in advance load information concerning the base stations 212 and 213, which are different base stations from the base station 211 currently communicating with the relay station 214, and when the base station 211 enters a congested state, changes the communication counterpart of the mobile station 239 over to any one of the base stations 212 or 213.

Figure 8:
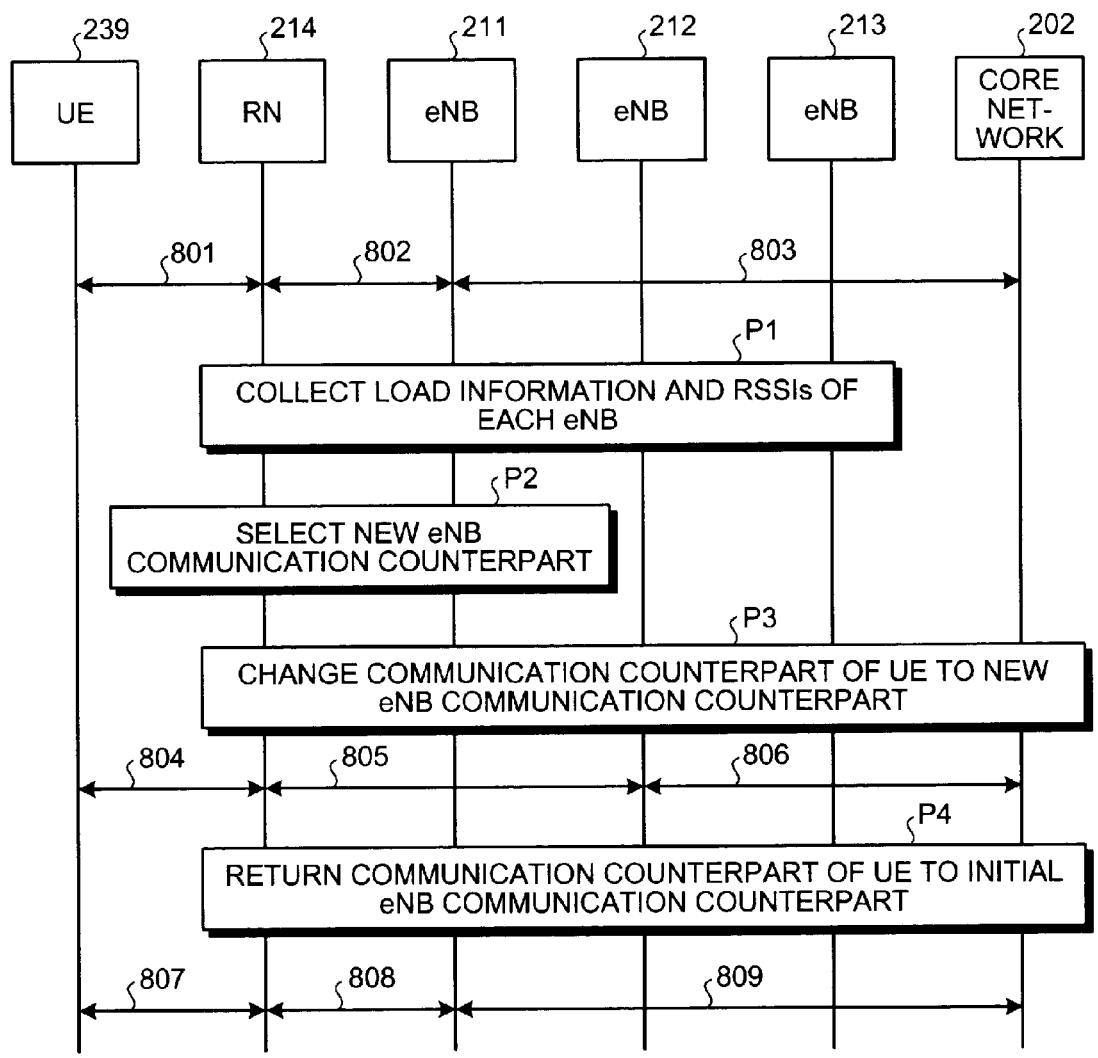
FIG. 8 is a sequence diagram of an example of operations of the communication system according to the first embodiment.

FIG. 8 is a sequence diagram of an example of operations of the communication system according to the first embodiment. In FIG. 8, reference numerals 801 to 809 represent communication between communication devices of the communication system 200. Operations of the communication system 200 depicted in FIG. 2 are divided into, for example, the following phases P1 to P4. As indicated by reference numerals 801 to 803, the mobile station 239 communicates with the base station 211 through relay by the relay station 214 and the base station 211 communicates with the core network 202.

The relay station 214 and the base stations 212 and 213 communicate with each other to collect load information and RSSIs of the base stations (eNB) 212 and 213 (phase P1). Phase P1 is repeated continuously, for example, after phase P2. However, when the base station 211 enters a cell barring state, for example, the base station 211 does not execute phase P1.

Subsequently, the relay station 214 and the base station 211 communicate with each other to select a base station (eNB) as a new communication counterpart (phase P2). It is assumed in this example that the base station 212 is selected as the new communication counterpart among the base stations 212 and 213.

The relay station 214, the base stations 211 and 212, and the core network 202 communicate with each other to change the current communication counterpart of the mobile station 239 (UE) over to the new base-station (eNB) communication counterpart (phase P3). As indicated by reference numerals 804 to 806, this brings about a state where the mobile station 239 communicates with the base station 212 through relay by the relay station 214 while the base station 212 communicates with the core network 202.

When the congested state of the base station 211 has been resolved after phase P3, the relay station 214, the base stations 211 and 212, and the core network 202 communicate with each other to change the current communication counterpart of the mobile station (UE) back to the initial base-station (eNB) communication counterpart (phase P4). As indicated by reference numerals 807 to 809, this brings about the original state where the mobile station 239 communicates with the base station 211 through relay by the relay station 214 while the base station 211 communicates with the core network 202. Phase P4 is executed not only when the congested state of the base station 211 is resolved but may also be executed when the cell barring state of the base station 211 is resolved.

Figure 9A:
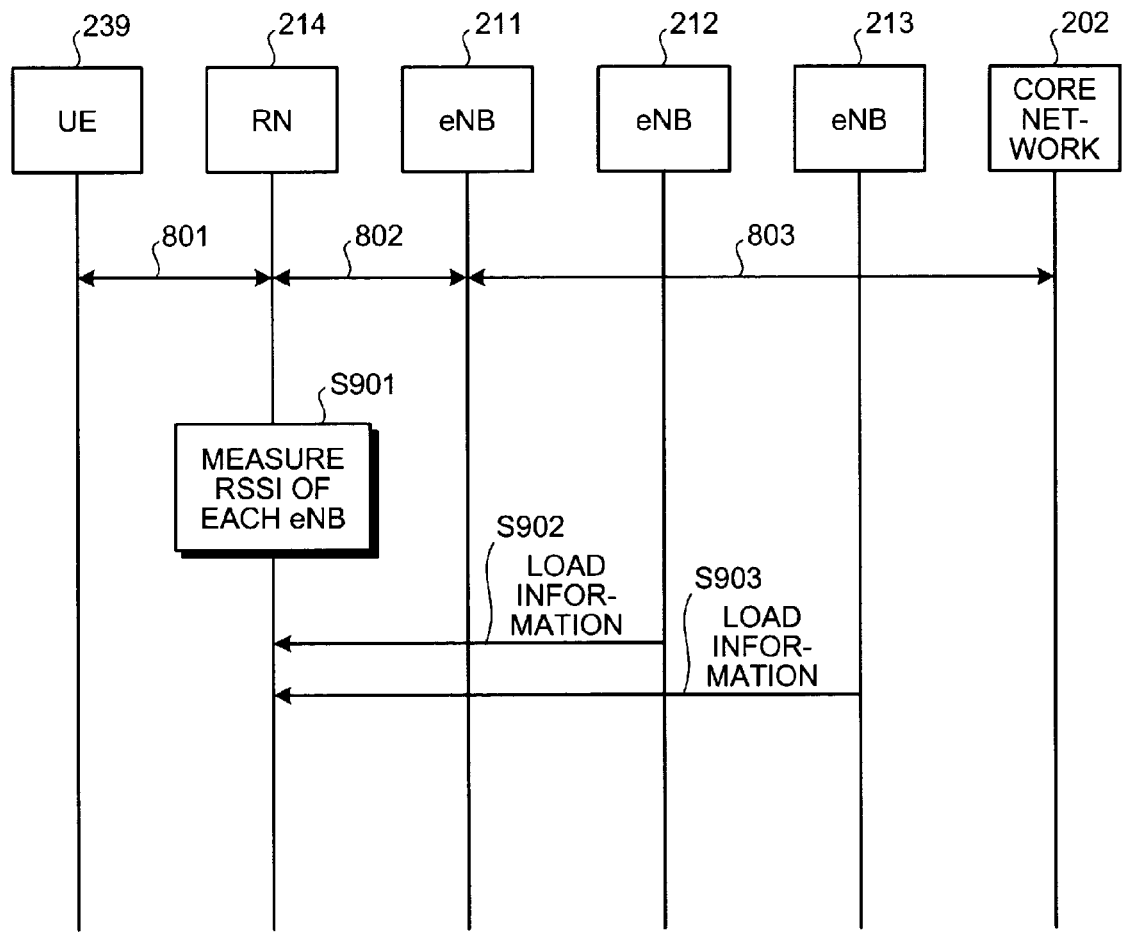
FIG. 9A is a sequence diagram of a first example of phase P1 depicted in FIG. 8.

FIG. 9A is a sequence diagram of a first example of phase P1 depicted in FIG. 8. In FIG. 9A, the components identical to those depicted in FIG. 8 are denoted by the same reference numerals used in FIG. 8 and description thereof is omitted. The relay station 214 measures RSSIs of the base stations (eNB) 212 and 213 based on radio signals from the base stations 212 and 213 (step S901).

The base station 212 distributes load information concerning the base station 212 by radio communication, and the relay station 214 receives the load information from the base station 212 (step S902). The base station 213 distributes load information concerning the base station 213 by radio communication, and the relay station 214 receives the load information from the base station 213 (step S903). The relay station 214 stores the load information received at steps S902 and S903. By periodically carrying out the above operations, the relay station 214 collects the load information and the RSSIs of the base stations 212 and 213.

Figure 9B:
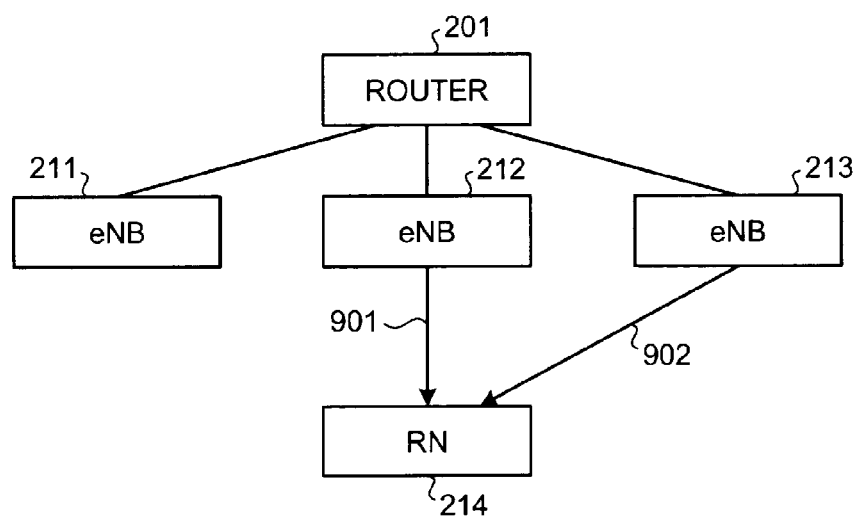
FIG. 9B depicts transmission/reception of signals during the operation of FIG. 9A.

FIG. 9B depicts transmission/reception of signals during the operation of FIG. 9A. As indicated by reference numerals 901 and 902 in FIG. 9B, the base stations 212 and 213 distribute load information by radio transmission. The relay station 214 scans all radio channels used in the vicinity of the relay station 214 and is thereby, able to receive load information concerning the base stations 212 and 213, which have no established radio link with the relay station 214.

Figure 10A:
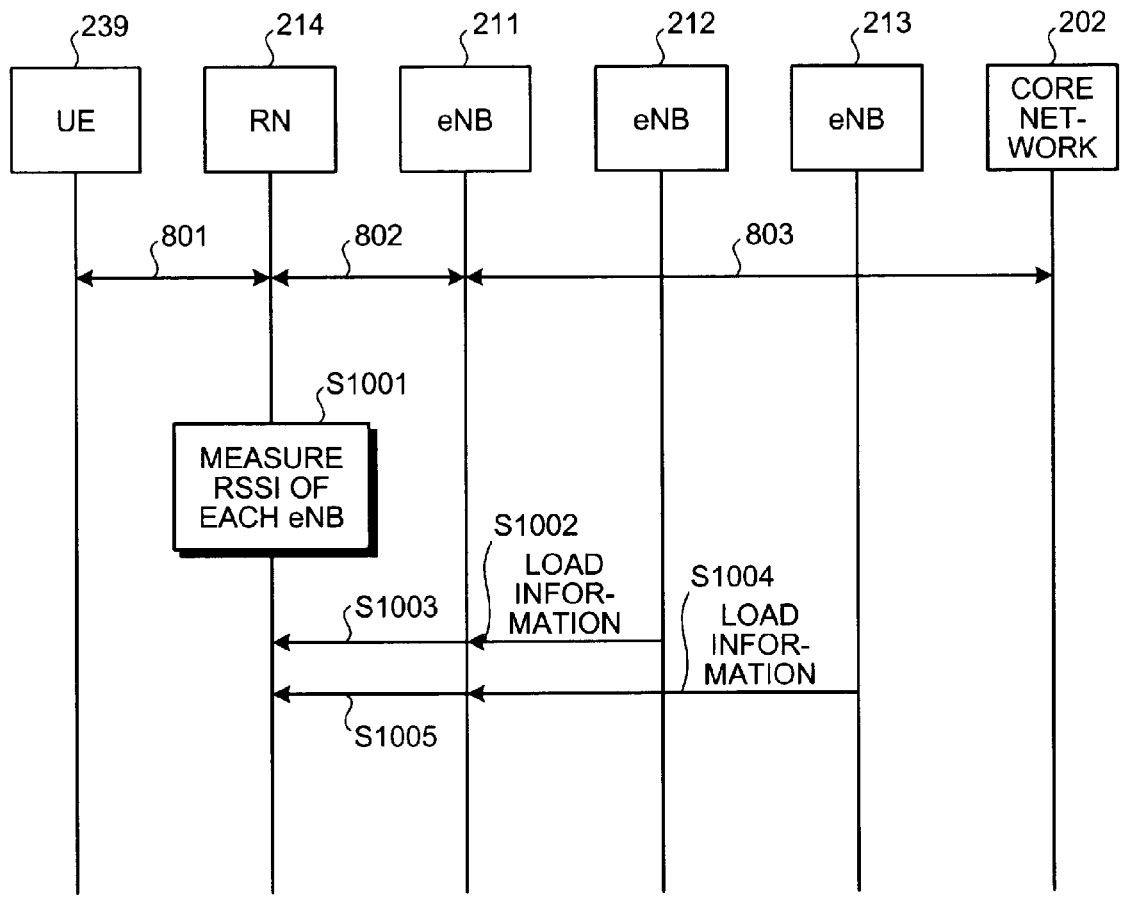
FIG. 10A is a sequence diagram of an second example of phase P1 depicted in FIG. 8.

FIG. 10A is a sequence diagram of an second example of phase P1 depicted in FIG. 8. In FIG. 10A, components identical to those depicted in FIG. 8 are denoted by the same reference numerals used in FIG. 8 and description thereof is omitted. The relay station 214 measures RSSIs of the base stations (eNB) 212 and 213 based on radio signals from the base stations 212 and 213 (step S1001).

The base station 212 transmits load information concerning the base station 212 to the base station 211 via the router 201 (step S1002), and the base station 211 transfers to the relay station 214, the load information from the base station 212 (step S1003). The base station 213 transmits to the base station 211 via the router 201, load information concerning the base station 213 (step S1004), and the base station 211 transfers to the relay station 214, the load information from the base station 213 (step S1005). The relay station 214 stores the load information transmitted from the base station 211. By periodically carrying out these operations, the relay station 214 collects the load information and RSSIs of the base stations 212 and 213.

Figure 10B:
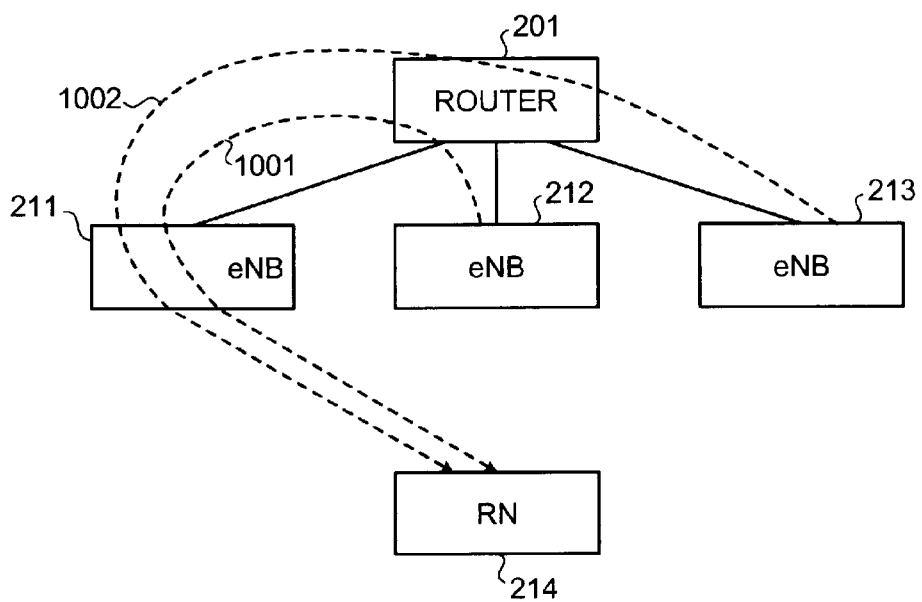
FIG. 10B depicts transmission/reception of signals during the operations depicted in FIG. 10A.

FIG. 10B depicts transmission/reception of signals during the operations depicted in FIG. 10A. As indicated by reference numerals 1001 and 1002 in FIG. 10B, the base stations 212 and 213 transmit load information to the relay station 214 via the base station 211. The load information is thus transmitted through the base station 211 having an established radio link with the relay station 214. In this manner, the load information concerning the base stations 212 and 213, which have no established radio link with the relay station 214, can be transmitted to the relay station 214.

FIG. 11 is a sequence diagram of an example of phase P2 depicted in FIG. 8. In FIG. 11, components identical to those depicted in FIG. 8 are denoted by the same reference numerals used on FIG. 8 and description thereof is omitted. At phase P1, upon determining that the base station 211 has entered a congested state, the base station 211 transmits a congestion notification signal to the relay station 214 (step S1101).

The relay station 214 selects a base station as a new communication counterpart from among the base stations 212 and 213 for which load information and RSSIs have been collected by the relay station 214 at phase P1 (step S1102). The relay station 214 transmits to the base station 211, base station information that indicates the base station selected at step S1102 (step S1103). In this manner, when the base station 211 enters a congested state, the relay station 214 selects a base station as a new communication counterpart and reports the selected base station to the base station 211.

Step S1101 is described as an example where the base station 211 is in a congested state and transmits a congestion notification signal to the relay station 214. As another example at step S1101, upon determining that the base station 211 has entered a cell barring state, the base station 211 transmits to the relay station 214, a cell barring notification signal. In this case as well, the operations as described above for steps S1102 and S1103 are carried out.

FIG. 12 is a sequence diagram of an example of phase P3 depicted in FIG. 8. In FIG. 12, components identical to those depicted in FIG. 8 are denoted by the same reference numerals used in FIG. 8 and description thereof is omitted. Upon receiving base station information from the relay station 214 at the phase 2, the base station 211 transmits to the base station indicated by the received base station information, an acceptance request signal requesting acceptance of the mobile station 239 (base station 212) (step S1201). The base station 211 transmits the acceptance request signal to the base station 212 via the router 201.

Subsequently, the base station 212 transmits to the base station 211 via the router 201, an acknowledgment signal in response to the acceptance request signal transmitted at step S1201 (step S1202). The base station 211 transmits to the relay station 214 a changeover instruction signal instructing to change the communication counterpart over to the base station 212 (step S1203).

As indicated by reference numerals 804 to 806, this brings about a state where the mobile station 239 communicates with the base station 212 through relay by the relay station 214 while the base station 212 communicates with the core network 202.

FIG. 13 is a sequence diagram of an first example of phase P4 depicted in FIG. 8. In FIG. 13, components identical to those depicted in FIG. 8 are denoted by the same reference numerals used in FIG. 8 and description thereof is omitted. It is assumed that following phase P3, the base station 211 detects the resolution of the congested state of the base station 211 (step S1301). For example, when the load volume of the base station 211 obtained as a monitored value becomes less than or equal to a threshold, the base station 211 determines that the congested state has been resolved. The base station 211 then transmits to the base station 212 via the router 201, a changeover request signal requesting that the communication counterpart of the mobile station 239 be changed over to the base station 211 (step S1302).

Subsequently, the base station 212 transmits to the relay station 214, a changeover instruction signal instructing to change the communication counterpart over to the base station 211 (step S1303). As indicated by reference numerals 807 to 809, this brings about the original state where the mobile station 239 communicates with the base station 211 through relay by the relay station 214 while the base station 211 communicates with the core network 202. Since the base station 211 had been communicating with the mobile station 239 up until the communication counterpart of the mobile station 239 was changed over to the base station 212, it is highly likely that the base station 211 offers fine communication quality for the mobile station 239. Hence, changing the communication counterpart of the mobile station 239 from the base station 212 back to the base station 211 improves communication quality.

FIG. 14 is a sequence diagram of a second example of phase P4 depicted in FIG. 8. In FIG. 14, components identical to those depicted in FIG. 8 are denoted by the same reference numerals used in FIG. 8 and description thereof is omitted. It is assumed that the relay station 214 detects the resolution of the congested state of the base station 211 based on load information from the base station 211 (step S1401) and that the relay station 214 then transmits to the base station 212, a changeover request signal requesting that the communication counterpart of the mobile station 239 be changed over to the base station 211 (step S1402).

Subsequently, the base station 212 transmits to the base station 211, an acceptance request signal requesting acceptance of the mobile station 239 (step S1403). The base station 211 transmits to the base station 212, an acknowledgment signal in response to the acceptance request signal transmitted at step S1403 (step S1404). The base station 212 transmits to the relay station 214, a changeover instruction signal instructing to change the communication counterpart over to the base station 211 (step S1405).

As indicated by reference numerals 807 to 809, this brings about the original state where the mobile station 239 communicates with the base station 211 through relay by the relay station 214 while the base station 211 communicates with the core network 202. Hence, communication quality is improved in the same manner as in the example described with reference to FIG. 13.

FIG. 15 is a sequence diagram of a modification of phase P4 depicted in FIG. 14. In FIG. 15, components identical to those depicted in FIG. 8 are denoted by the same reference numerals used in FIG. 8 and description thereof is omitted. In FIG. 15, reference numerals 1501 to 1503 represent communication between communication devices of the communication system 200. It is assumed that the relay station 214 detects that the optimum communication counterpart of the mobile station 239 has changed from the base station 212 to the base station 213 (step S1501). For example, the relay station 214 determines that the marginal load volume of the base station 213 has become larger than that of the base station 212, based on load information from the base stations 212 and 213.

The relay station 214 then transmits to the base station 212, a changeover request signal requesting that the communication counterpart of the mobile station 239 be changed over to the base station 213 (step S1502). Subsequently, the base station 212 transmits to the base station 213, an acceptance request signal requesting acceptance of the mobile station 239 (step S1503). The base station 213 then transmits to the base station 212, an acknowledgment signal in response to the acceptance request signal transmitted at step S1503 (step S1504).

The base station 212 transmits to the relay station 214, a changeover instruction signal instructing that the communication counterpart be changed over to the base station 213 (step S1505). As indicated by reference numerals 1501 to 1503, this brings about a state where the mobile station 239 communicates with the base station 213 through relay by the relay station 214 while the base station 213 communicates with the core network 202. In this manner, when the marginal load volume of the base station 213 becomes larger than that of the base station 212, the communication counterpart of the mobile station 239 may be changed from the base station 212 over to the base station 213.

Figure 16:
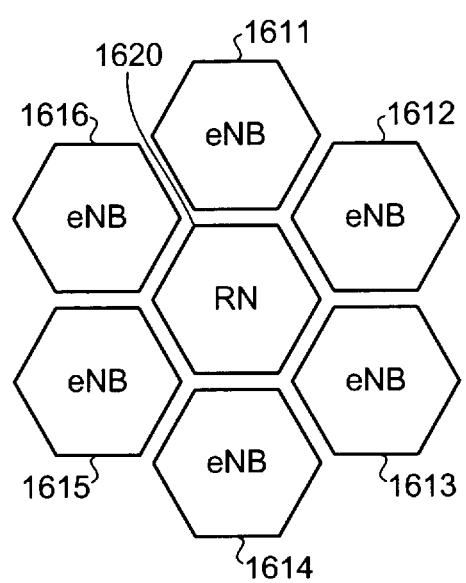
FIG. 16 depicts an improvement in a congestion prevention rate of the communication system according to the first embodiment.

FIG. 16 depicts an improvement in a congestion prevention rate of the communication system according to the first embodiment. A communication system 1600 of FIG. 16 includes base stations (eBN) 1611 to 1616 and a relay station (RN) 1620. The base stations 1611 to 1616 are located in a vicinity of the relay station 1620, encompassing the relay station 1620. An example where the communication system 1600 is applied to the communication system 100 of the first embodiment (see FIG. 1) will be described. For example, the base stations 1611 to 1616 are applied to the first base station 110 or the second base station 120 and the relay station 1620 is applied to the relay station 130.

The load volume that can be processed by each of the base stations 1611 to 1616 is denoted as le, for which a value range is set as $0 \leq le \leq 1$ (le=0, 0.1, . . . , 1). A load volume le that exceeds 1 signifies a congested state. A load volume that can be processed by the relay station 1620 is denoted as lr, for which a value range is set as $0 \leq lr \leq 0.5$ (lr=0, 0.1, . . . , 0.5). A load volume lr that exceeds 0.5 signifies a congested state.

The load volume le+lr yielded by adding the load volume lr of the relay station 1620 and the load volume le of any one of the base stations 1611 to 1616 has a value range set as $0 \leq le+lr \leq 1.5$ (le+lr=0, 0.1, . . . , 1.5). In this case, a load volume le+lr that exceeds 1.5 signifies a congested state. If it is assumed that the load volume le+lr takes each of values 0, 0.1, . . . , 1.5 at a uniform probability, the probability of any one of the base stations 1611 to 1616 entering a congested state is $22/11*6=0.318$ (31.8%). Hence, the probability of preventing a case where all of the base stations 1611 to 1616 enter a congested state is $1-0.318=0.682$ (68.2%).

According to the communication system 1600, however, the base stations 1611 to 1616 as communication counterparts can be changed through the relay station 1620. For this reason, the probability of any one of the base stations 1611 to 1616 entering a congested state is reduced to $0.318^6=0.00103$ (0.103%). Hence, the probability of preventing a case where all of the base stations 1611 to 1616 enter a congested state is $1-0.00103=0.999$ (99.9%). In this manner, application of the communication system 1600 to the communication system 100 improves the probability of preventing a case where all of the base stations 1611 to 1616 enter a congested state (congestion prevention rate).

According to the communication system 100 of the first embodiment, the relay station 130 collects in advance load information concerning the second base station 120, which is different from the first base station 110 that is currently communicating with the mobile station 140. When the first base station 110 enters a congested state, etc., the relay station 130 selects the second base station 120 as a new communication counterpart based on the load information. In this manner, communication changeover to a proper base station can be carried out.

Consequently, for example, a case where a base station as a new communication counterpart also enters a congested state can be prevented, thereby improving communication quality. Even if the mobile station 140 finds no relay station or base station other than the relay station 130 to connect with for handover, communication quality is improved by changing the base station connected to the relay station 130 from the base station 110 over to the base station 120.

Although a configuration in which the relay station 130 selects a base station as a new communication counterpart is described in the first embodiment, a configuration in which the first base station 110 selects a base station as a new communication counterpart will be described in a second embodiment.

Figure 17B:
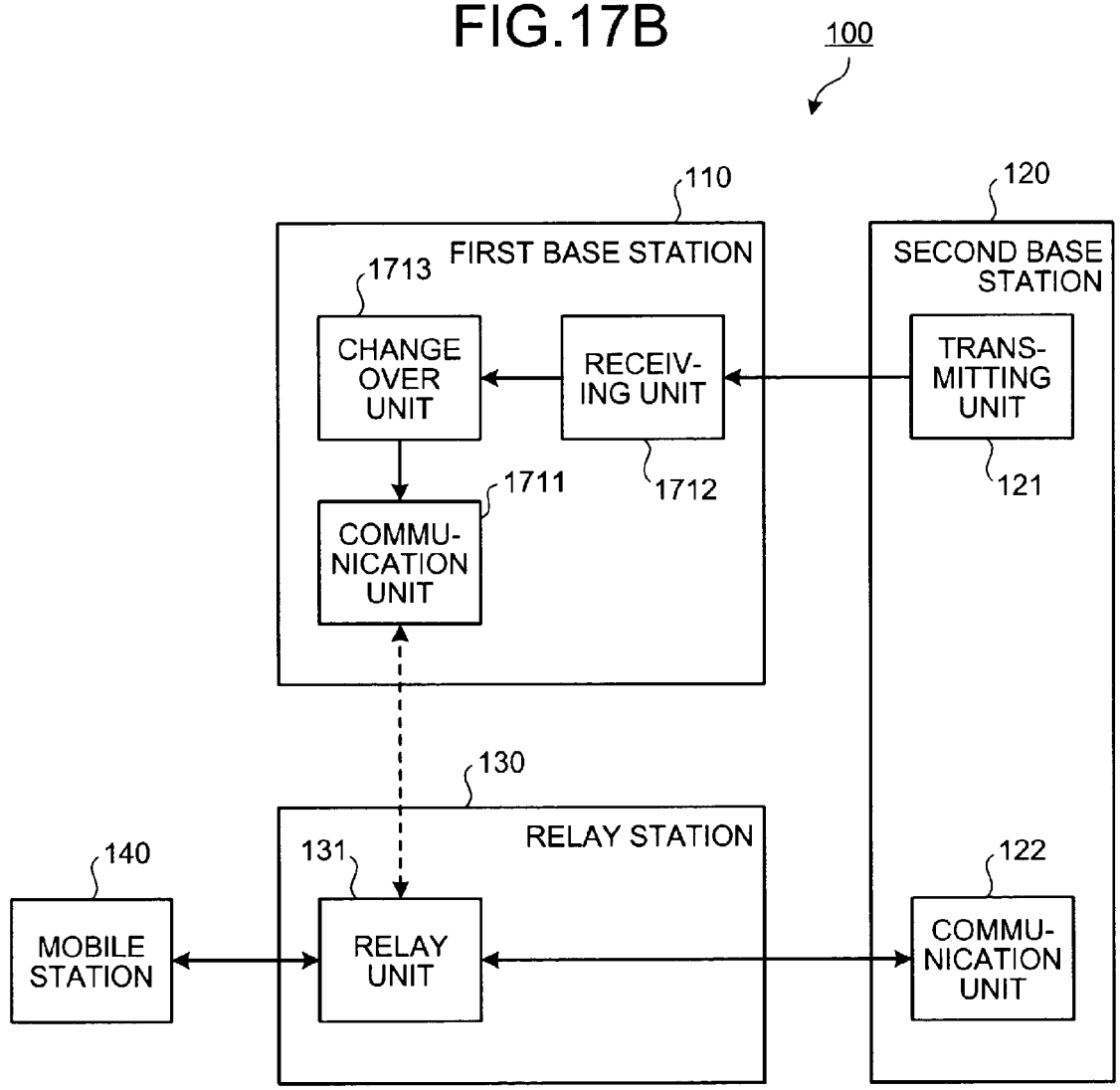

FIGS. 17A and 17B are block diagrams of a communication system according to the second embodiment. In FIGS. 17A and 17B, components identical to those depicted in FIGS. 1A and 1B are denoted by the same reference numerals used in FIGS. 1A and 1B and description thereof is omitted.

As depicted in FIG. 17A, the first base station 110 according to the second embodiment includes a communication unit 1711, a receiving unit 1712, and a changeover unit 1713. The communication unit 1711 communicates with the mobile station 140 through relay by the relay station 130. The receiving unit 1712 receives load information concerning the second base station 120 located in a vicinity of the relay station 130. For example, the receiving unit 1712 receives the load information concerning the second base station 120 from the second base station 120 through wired communication, etc. The receiving unit 1712 outputs the received load information to the changeover unit 1713.

As depicted in FIG. 17B, the changeover unit 1713 changes the communication counterpart of the mobile station 140 from the first base station 110 over to the second base station 120, based on load information output from the receiving unit 1712. For example, when the first base station 110 enters a congested state, the changeover unit 1713 changes the communication counterpart of the mobile station 140. As another example, the changeover unit 1713 changes the communication counterpart of the mobile station 140 when the first base station 110 enters a cell barring state.

The changeover unit 1713 determines whether to change the communication counterpart of the mobile station 140 from the first base station 110 over to the second base station 120, based on, for example, the marginal load volume indicated by load information output from the receiving unit 1712. For example, the changeover unit 1713 changes the communication counterpart over to the second base station 120 when the marginal load volume indicated by the load information is greater than or equal to than a threshold.

In another example where the second base stations 120 are present in plural, the receiving unit 1712 receives load information concerning the second base stations 120. Based on the load information received by the receiving unit 1712, the changeover unit 1713 selects a base station as a new communication counterpart among the second base stations 120 and changes the communication counterpart of the mobile station 140 over to the selected base station.

The transmitting unit 121 of the second base station 120 transmits to the first base station 110, load information concerning the second base station 120. When the first base station 110 changes the communication counterpart of the mobile station 140 from the first base station 110 over to the second base station 120 based on the load information transmitted from the transmitting unit 121, the communication unit 122 starts communicating with the mobile station 140 through relay by the relay station 130.

The relay station 130 has the relay unit 131. According to the second embodiment, the receiving unit 132 and the changeover unit 133 depicted in FIG. 1A may be omitted from the relay station 130. The relay unit 131 changes the communication counterpart of the mobile station 140 from the first base station 110 over to the second base station 120 under control by the first base station 110.

When the first base station 110 changes the communication counterpart of the mobile station 140 from the first base station 110 over to the second base station 120 based on load information concerning the second base station 120, which is located in a vicinity of the relay station 130, the mobile station 140 continues communication by communicating with the second base station 120 through relay by the relay station 130.

The communication system 200 depicted in FIG. 2 can be applied to the communication system 100 depicted in FIGS. 17A and 17B, for example. In the communication system 200 depicted in FIG. 2, the base stations 212 and 213 each periodically transmit load information to the base station 211. While communicating with the mobile station 239 through relay by the relay station 214, the base station 211 receives the load information from the base stations 212 and 213 and stores the received load information.

When the base station 211 enters a congested state or a cell barring state, the base station 211 selects a base station as a new communication counterpart from among the base stations 212 and 213, based on the stored pieces of load information, and changes the communication counterpart of the mobile station 239 over to the selected base station.

FIG. 18 is a block diagram of an example of the base station according to the second embodiment. In FIG. 18, components identical to those depicted in FIG. 3 are denoted by the same reference numerals used in FIG. 3 and description thereof is omitted. As depicted in FIG. 18, each of the base stations 211 to 213 includes a memory 1801 and a base station selection processor 1802, in addition to the components depicted in FIG. 3.

The physical layer reception processor 301 carries out a reception process on the RSSIs transmitted from the relay station 214. The RSSIs transmitted from the relay station 214 are, for example, the RSSIs from the base station 212 or 213 that are measured at the relay station 214. The physical layer reception processor 301 carries out reception process on the communication load information that is transmitted from the relay station 214 and indicates the relay communication load volume of the relay station 214. The physical layer reception processor 301 further carries out a reception process on the load information that concerns the base stations 212 and 213 and is transmitted from the base stations 212 and 213.

The data link layer reception processor 302 outputs to the memory 180, load information, communication load information, and an RSSI included in a signal output from the physical layer reception processor 301. When determining that the base station is in a congested state the congestion determining unit 308 outputs to the base station selection processor 1802, a congestion notification signal that indicates that the base station is in a congested state. The congestion determining unit 308 outputs a cell barring notification signal to the base station selection processor 1802 upon determining that the base station is in a cell barring state. The memory 1801 stores the load information, the communication load information, and the RSSIs output from the data link layer reception processor 302.

The base station selection processor 1802 is identical in configuration to the base station selection processor 409 depicted in FIG. 4. When a congestion notification signal or a cell barring notification signal is output from the congestion determining unit 308, the base station selection processor 1802 selects a base station as a new communication counterpart. Selection of a base station as a new communication counterpart by the base station selection processor 1802 will be described later.

To match a communication counterpart of the mobile station 239 to the selected base station, the base station selection processor 1802 outputs an acceptance request signal requesting acceptance of the mobile station 239 and a changeover instruction signal instructing to change the communication counterpart over to the selected base station. The acceptance request signal output from the base station selection processor 1802 is transmitted by the data relay unit 303, via the router 201, to the base station selected by the base station selection processor 1802 (the route of transmission is not arrowed). The acceptance request signal output from the base station selection processor 1802 is transmitted by the physical layer transmission processor 305 to the relay station 214.

In this manner, when the base station 211 enters a congested state, a communication counterpart of the mobile station 239 can be changed over to the base station 212 or 213. At this time, the communication counterpart of the mobile station 239 can be selected based on load information concerning the base stations 212 and 213, which means that a base station can be selected as a new communication counterpart according to the marginal load volume of each of the base stations 212 and 213.

The base station selection processor 1802 selects a base station as a new communication counterpart, based on load information stored in the memory 1801. For example, the base station selection processor 1802 selects the base station having the largest marginal load volume among the base stations 212 and 213, based on the load information.

The base station selection processor 1802 may select a base station as a new communication counterpart, based on load information and communication load information stored in the memory 1801. For example, it is assumed that the load information includes a load volume and a given threshold. The base station selection processor 1802 calculates the sum of the load volume indicated by the load information and the load volume indicated by the communication load information. The base station selection processor 1802 compares the calculated sum of the load volumes and the threshold indicated by the load information, and selects, from among the base stations 212 and 213, a base station for which the sum of the load volumes is less than or equal to the threshold.

In this manner, load volumes of the base stations 212 and 213 expected to result when the communication counterpart of the mobile station 239 is changed over to the base stations 212 and 213 are calculated based on communication load information from the relay station 214 and load information from the base stations 212 and 213, and the communication counterpart of the mobile station 239 is changed based on the result of this calculation. This ensures that when the communication counterpart of the mobile station 239 is changed, the base station as the new communication counterpart does not enter a congested state.

The base station selection processor 1802 may select, as a new communication counterpart, a base station for which the sum of load volumes is less than or equal to the threshold and having the largest RSSI stored in the memory 1801, among the base stations 212 and 213. This ensures that when the communication counterpart of the mobile station 239 is changed, the base station as the new communication counterpart does not enter a congested state and that the communication counterpart of the mobile station 239 is changed over to a base station having a larger RSSI. As a result, communication quality is improved.

Figure 19:
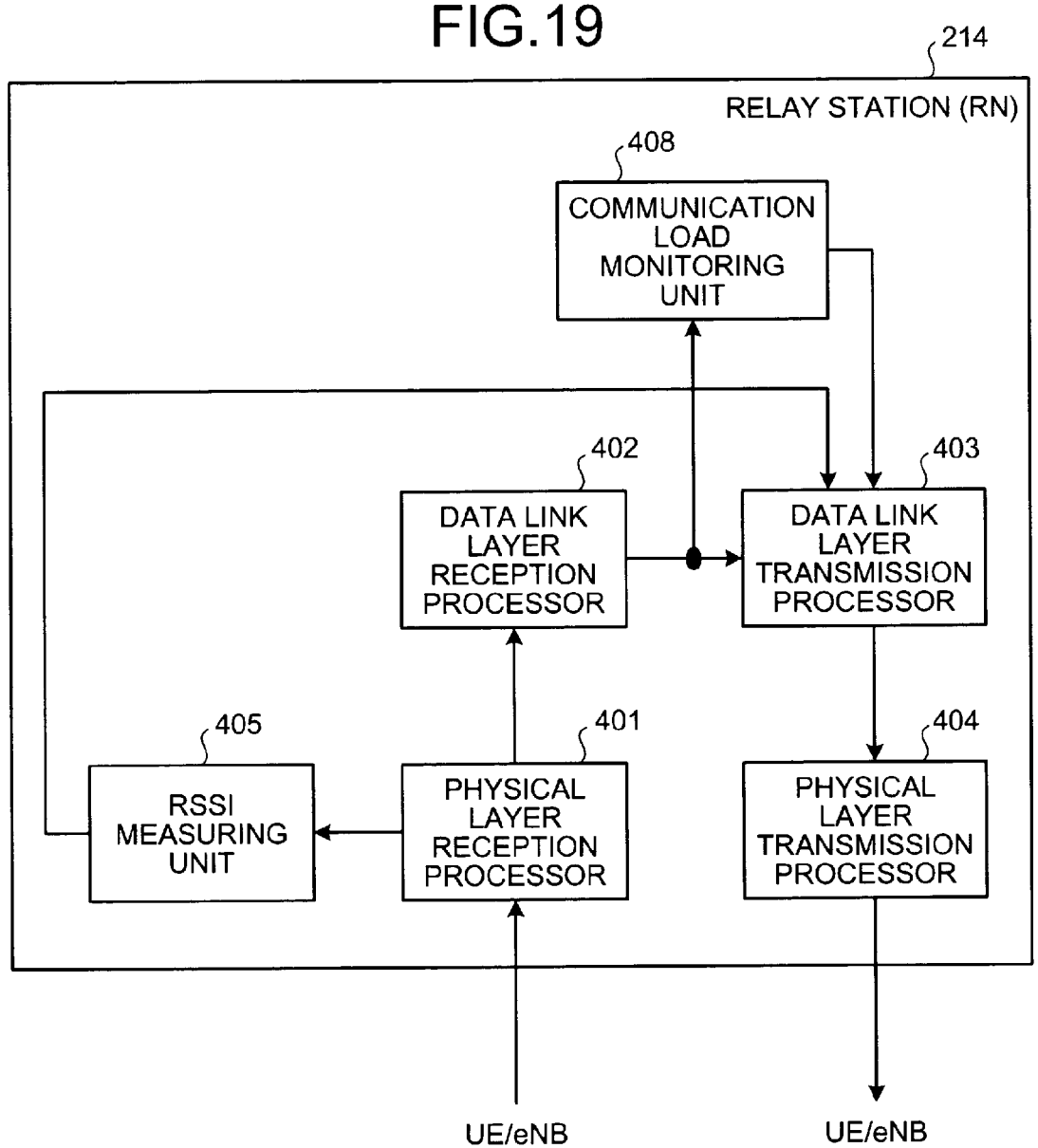
FIG. 19 is a block diagram of an example of the relay station according to the second embodiment.

FIG. 19 is a block diagram of an example of the relay station according to the second embodiment. In FIG. 19, components identical to those depicted in FIG. 4 are denoted by the same reference numerals used in FIG. 4 and description thereof is omitted. As depicted in FIG. 19, the relay station 214 includes the physical layer reception processor 401, the data link layer reception processor 402, the data link layer transmission processor 403, the physical layer transmission processor 404, the RSSI measuring unit 405, and the communication load monitoring unit 408.

In the second embodiment, the base station load monitoring unit 406, the memory 407, and the base station selection processor 409 may be omitted from the relay station 214. The RSSI measuring unit 405 outputs the measured RSSIs to the data link layer transmission processor 403. The RSSIs output from the RSSI measuring unit 405 to the data link layer transmission processor 403 are transmitted by the physical layer transmission processor 404 to the base station 211.

The communication load monitoring unit 408 outputs to the data link layer transmission processor 403, communication load information that indicates the load volume obtained as a monitored value. The communication load information output from the communication load monitoring unit 408 to the data link layer transmission processor 403 is transmitted by the physical layer transmission processor 404 to the base station 211. In this manner, each of RSSIs of the base stations 212 and 213 and communication load information indicating the relay communication load volume of the relay station 214 can be transmitted to the base station 211.

FIG. 20 is a flowchart of an example of operations of the first base station. With reference to FIG. 20, operations of the base station 211 (first base station) communicating with the mobile station 239 before communication changeover by the relay station 214, will be described. The base station 211 executes, for example, each of the following steps. The base station 211 determines whether load information has been received from the base stations 212 and 213 (step S2001). If load information has been received (step S2001: YES), the base station 211 stores the received load information (step S2002), and proceeds to step S2003.

If load information has not been received at step S2001 (step S2001: NO), the base station 211 monitors the load volume of the base station 211 (data relay unit 303) (step S2003). The base station 211 determines whether the load volume obtained as a monitored value at step S2003 exceeds a threshold (step S2004). If the load volume does not exceed the threshold (step S2004: NO), the base station 211 returns to step S2001.

If the load volume exceeds the threshold at step S2004 (step S2004: YES), the base station 211 selects a base station as a new communication counterpart based on the load information stored at step S2002 (step S2005). The base station 211 transmits an acceptance request signal to the base station selected at step S2005 (step S2006). The base station 211 determines whether an acknowledgment signal in response to the acceptance request signal transmitted at step S2006 has been received (step S2007), and stands by until the acknowledgment signal has been received (step S2007: NO).

At step S2007, when an acceptance acknowledgment signal is received (step S2007: YES), the base station 211 transmits to the relay station 214, a changeover instruction signal (step S2008), and ends the series of operations. The relay station 214, upon receiving the changeover instruction signal from the base station 211, changes the communication counterpart of the mobile station 239 from the base station 211 to the base station 212 or the base station 213. In this manner, when the base station 211 enters a congested state, the communication counterpart of the mobile station 239 can be changed from the base station 211 over to the base station 212 or base station 213.

Operations of the base station 212 (second base station) that communicates with the mobile station 239 after communication changeover by the relay station 214 are identical to those of the base station 212 depicted in FIG. 6 and description thereof is omitted.

FIG. 21 is a flowchart of an example of operations of the relay station. The relay station 214 executes, for example, each of the following steps. The relay station 214 monitors the relay communication load volume of the relay station 214 (step S2101). The relay station 214 transmits to the base station 211, communication load information that indicates the load volume obtained at step S2101 (step S2102).

The relay station 214 determines whether a changeover instruction signal has been received from the base station 211 (step S2103), and stands by until a changeover instruction signal has been received (step S2103: NO). When a changeover instruction signal has been received (step S2103: YES), the relay station 214 carries out a changeover process of changing the communication counterpart of the mobile station 239 over to the base station indicated as the new communication counterpart by the received changeover instruction signal (step S2104), and ends the series of operations.

Operations of the communication system 200 of the second embodiment are divided into, for example, phases P1 to P4 depicted in FIG. 8.

FIG. 22A is a sequence diagram of an example of phase P1 depicted in FIG. 8. In FIG. 22A, components identical to those depicted in FIG. 8 are denoted by the same reference numerals used in FIG. 8 and description thereof is omitted. The relay station 214 measures RSSIs of the base stations (eNB) 212 and 213 based on radio signals from the base stations 212 and 213 (step S2201).

The base station 212 transmits load information concerning the base station 212 to the base stations 211 (step S2202). The base station 213 transmits load information concerning the base station 213 to the base stations 211 (step S2203). The base station 211 stores the load information received at steps 2202 and 2203.

Subsequently, the relay station 214 transmits the RSSIs measured at step S2201 to the base station 211 (step S2204). The base station 211 stores the RSSIs received at step S2204. The base station 211 periodically carries out the above operations to collect the load information and RSSIs of the base stations 212 and 213. The relay station 214 may transmit communication load information to the base station 211 so that the base station 211 stores the communication load information.

Figure 22B:
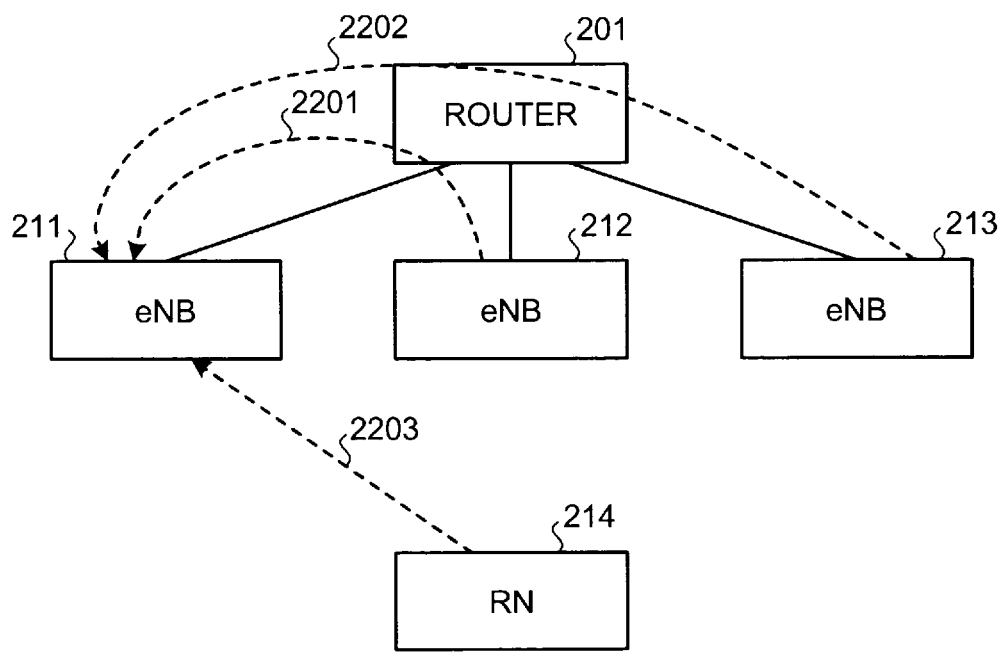
FIG. 22B depicts transmission/reception of signals during the operations depicted in FIG. 22A.

FIG. 22B depicts transmission/reception of signals during the operations depicted in FIG. 22A. As indicated by reference numerals 2201 and 2202 in FIG. 22B, the base stations 212 and 213 transmit load information to the base station 211 via the router 201. As indicated by reference numeral 2203, the relay station 214 transmits the RSSIs of the base stations 212 and 213 to the base station 211 through an established radio link with the base station 211.

FIG. 23 is a sequence diagram of an example of phase P2 depicted in FIG. 8. In FIG. 23, components identical to those depicted in FIG. 8 are denoted by the same reference numerals used in FIG. 8 and description thereof is omitted. At phase P1, upon determining that the base station 211 has entered a congested state, the base station 211 selects a base station as a new communication counterpart based on the load information and the RSSIs collected at phase P1 (step S2301). In this manner, according to the second embodiment, the base station 211 is able to select a base station as a new communication counterpart. The volume of communication between the base station 211 and the relay station 214, therefore, can be reduced.

An example of phase P3 according to the second embodiment is identical to the example depicted in FIG. 12 and is, therefore, omitted in further description. An example of phase P4 according to the second embodiment is identical to the example depicted in FIG. 13 and is, therefore, omitted in further description.

FIG. 24 is a sequence diagram of a modification of phase P4 according to the second embodiment. In FIG. 24, components identical to those depicted in FIG. 8 are denoted by the same reference numerals used in FIG. 8 and description thereof is omitted. It is assumed that the base station 211 detects that the optimum communication counterpart of the mobile station 239 has changed from the base station 212 to the base station 213 (step S2401). For example, the base station 211 determines that the marginal load volume of the base station 213 has become larger than that of the base station 212, based on load information from the base stations 212 and 213.

The base station 211 transmits to the base station 212, a changeover request signal requesting that the communication counterpart of the mobile station 239 be changed over to the base station 213 (step S2402). Operations at steps S2403 to S2405 depicted in FIG. 24 are identical to those at steps S1503 to S1505 depicted in FIG. 15 and description thereof is omitted. In this manner, the communication counterpart of the mobile station 239 may be changed from the base station 212 over to the base station 213 when the marginal load volume of the base station 213 has become larger than that of the base station 212.

A congestion prevention rate of the communication system 100 of the second embodiment is identical to that of the communication system 100 according to the second embodiment depicted in FIG. 16 (see FIG. 16) and description thereof is omitted.

In this manner, according to the communication system 100 of the second embodiment, the first base station 110 collects in advance load information concerning the second base station 120, which is different from the first base station 110 that is currently communicating with the mobile station 140. When the first base station 110 enters a congested state, etc., the first base station 110 selects the second base station 120 as a new communication counterpart, based on the load information. This enables communication changeover to a proper base station and thereby improves communication quality.

Operations of the mobile stations 239 and 240 according to the first and second embodiments will be described as operations carried out when the communication counterparts of the mobile stations 239 and 240 are changed from the base station 211 over to the base station 212. The above mentioned case will first be described, where the relay station 214 is the "L3 relaying" type and the mobile stations 239 and 240 recognize the relay station 214 as an eNB.

Figure 25:
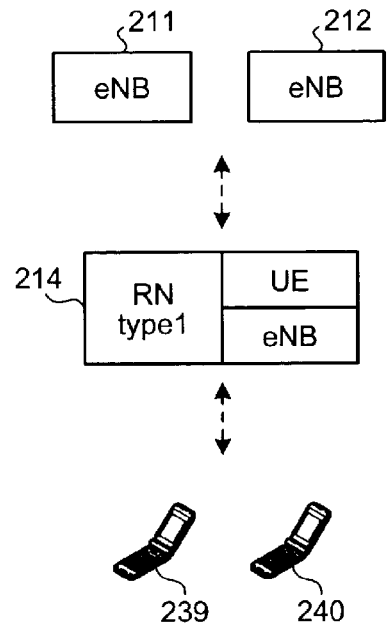
FIG. 25 depicts a first configuration example of the relay station.

FIG. 25 depicts a first configuration example of the relay station. As indicated in FIG. 25, the relay station 214 (RN type 1) relays by operating as an eNB to the mobile stations 239 and 240 and as an UE to the base stations 211 to 213. The mobile stations 239 and 240, therefore, recognize the relay station 214 as an eNB. In this case, the relay station 214 carries out handover for changing the communication counterparts of the mobile stations 239 and 240 from the base station 211 over to the base station 212.

Figure 26:
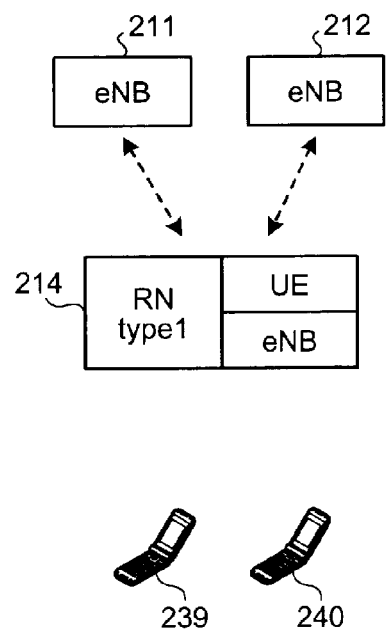
FIG. 26 depicts handover carried out in the configuration example depicted in FIG. 25.

FIG. 26 depicts handover carried out in the configuration example depicted in FIG. 25. As depicted in FIG. 26, when the relay station 214 is the "L3 relaying" type, communication changeover is carried out between the relay station 214 and the base stations 211 and 212. In this case, no action by the mobile stations 239 and 240 is necessary when the communication counterparts of the mobile stations 239 and 240 are changed from the base station 211 over to the base station 212.

Another example will be described, where the relay station 214 is the "L2 relaying" type and the mobile stations 239 and 240 recognize links as direct links to the base station 211.

Figure 27:
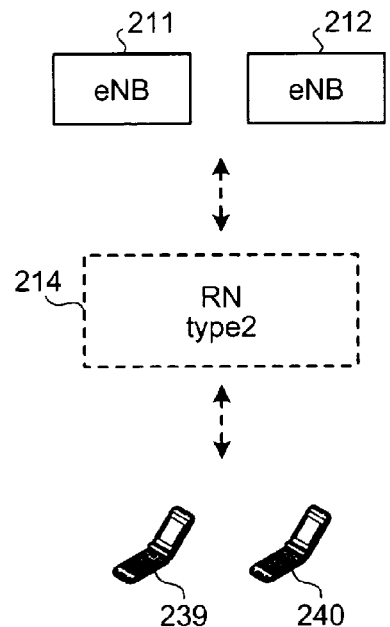
FIG. 27 depicts a second configuration example of the relay station.

FIG. 27 depicts a second configuration example of the relay station. As depicted in FIG. 27, the base stations 211 and 212 and the mobile stations 239 and 240 recognize the relay station 214 (RN type 2) as an RN. The mobile stations 239 and 240 carry out a process of communicating with the base stations 211 and 212 via the relay station 214. In this case, the base station 211 carries out handover for changing the communication counterparts of the mobile stations 239 and 240 from the base station 211 over to the base station 212.

Figure 28:
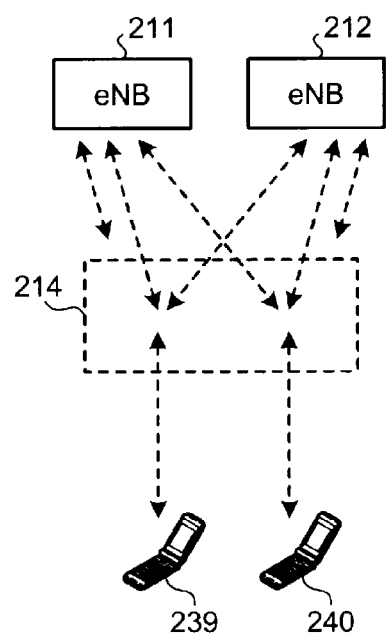
FIG. 28 depicts handover in the configuration example depicted in FIG. 27.

FIG. 28 depicts handover in the configuration example depicted in FIG. 27. As depicted in FIG. 28, when the relay station 214 is the "L2 relaying" type, communication changeover is carried out between the relay station 214 and the base stations 211 and 212, and the mobile stations 239 and 240 change the communication counterparts from the base station 211 over to the base station 212 via the relay station 214.

Figure 29:
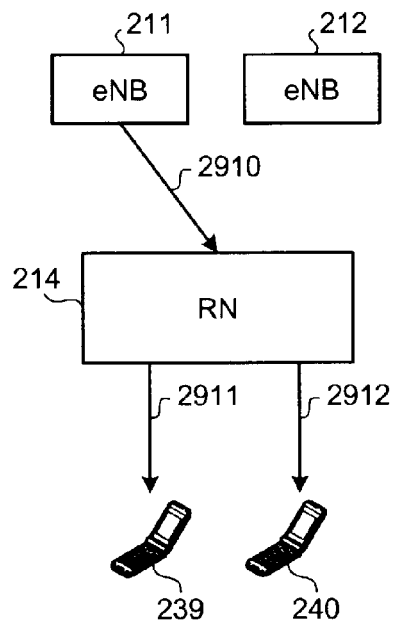
FIG. 29 is a first diagram of an example of handover operations.

FIG. 29 is a first diagram of an example of handover operations. As depicted in FIG. 29, when the communication counterparts of the mobile stations 239 and 240 are changed from the base station 211 over to the base station 212, the base station 211 transmits a consolidated message 2910 to the relay station 214. The consolidated message 2910 includes a handover message for the mobile station 239 and a handover message 2912 for the mobile station 240.

The relay station 214 divides the consolidated message 2910 received from the base station 211 into a message 2911 and a message 2912. The relay station 214 then transmits the message 2911 and the message 2912 to the mobile station 239 and the mobile station 240, respectively. The relay station 214 temporary stores division information indicating that the consolidated message 2910 has been divided into the message 2911 and the message 2912.

Figure 30:
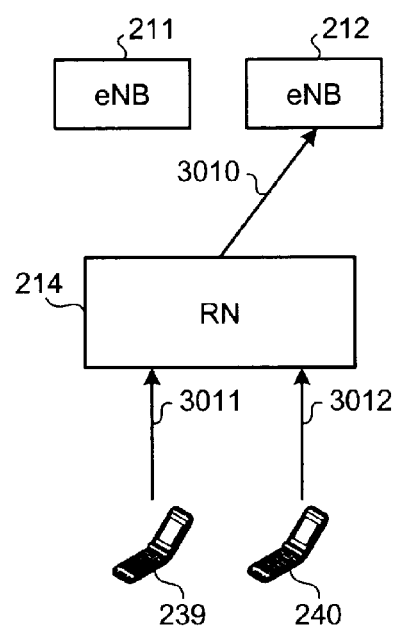
FIG. 30 is a second diagram of the example of handover operations.

FIG. 30 is a second diagram of the example of handover operations. As depicted in FIG. 30, upon receiving the message 2911 from the relay station 214, the mobile station 239 transmits to the relay station 214, a message 3011 requesting handover to the base station 212. Upon receiving the message 2912 from the relay station 214, the mobile station 240 transmits to the relay station 214, a message 3012 requesting handover to the base station 212.

Based on the stored division information, the relay station 214 stands by until the messages 3011 and 3012 have been received from the mobile stations 239 and 240. Upon receiving the messages 3011 and 3012, the relay station 214 transmits to the base station 212, a consolidated message 3010 that includes the received messages 3011 and 3012.

The base station 212 obtains the messages 3011 and 3012 from the consolidated message 3010 received from the relay station 214, and starts communicating with the mobile stations 239 and 240 based on the obtained messages 3011 and 3012. In this manner, handover for changing the communication counterpart of the mobile stations 239 and 240 from the base station 211 over to the base station 212 can be carried out.

FIG. 31 is a first flowchart of an example of handover operations of the relay station. As depicted in FIG. 31, the relay station 214 determines whether a message has been received from the base station (e.g., base station 211) (step S3101), and stands by until a message has been received (step S3101: NO). When a message has been received from the base station (step S3101: YES), the relay station 214 determines whether the message received at step S3101 is a consolidated message (step S3102).

If the received message is not a consolidated message at step S3102 (step S3102: NO), the relay station 214 proceeds to step S3106. If the received message is a consolidated message (step S3102: YES), the relay station 214 divides the received consolidated message into messages for individual mobile stations (step S3103). The relay station 214 saves to a table of the relay station 214 and as group x, information of each message created at step S3103 (step S3104). The information saved to the table includes, for example, the sequence number and address of the respective message.

The relay station 214 starts a timer that corresponds to the group x saved at step S3104 (step S3105). The relay station 214 transmits the messages to the mobile station to which the messages are addressed (step S3106), and ends the series of operations. If the message received at step S3101 is not a consolidated message, the message transmitted at step S3106 is the received message itself. If the message received at step S3101 is a consolidated message, the message transmitted at step S3106 is each message created at step S3103.

FIG. 32 is a second flowchart of the example of handover operations of the relay station. As depicted in FIG. 32, the relay station 214 determines whether a message has been received from the mobile station (e.g., mobile stations 239 and 240) (step S3201), and stands by until a message has been received (step S3201: NO). When a message has been received (step S3201: YES), the relay station 214 determines whether a table thereof includes a message corresponding to the received message (step S3202).

A message corresponding to the received message is, for example, a message having a sequence number that is identical to that of the received message, a message that is addressed to the sender of the received message, etc. If the table does not include a message corresponding to the received message (step S3202: NO), the relay station 214 proceeds to step S3207.

If the table includes a message corresponding to the received message (step S3202: YES), the relay station 214 deletes the corresponding message from the table (step S3203). The relay station 214 saves the received message to a buffer of the relay station 214 (step S3204).

The relay station 214 determines whether all messages corresponding to the messages making up the group x are saved in the buffer of the relay station 214 (step S3205). If all messages corresponding to the messages making up the group x are not been saved in the buffer (step S3205: NO), the relay station 214 ends the series of operations. If all messages corresponding to the messages making up the group x are saved in the buffer (step S3205: YES), the relay station 214 consolidates all of the messages (step S3206).

The relay station 214 then transmits the consolidated message to the base station to which the messages are addressed (e.g., base station 212) (step S3207), and ends the series of operations. If a message corresponding to the received message is not included in the table, the message transmitted at step S3207 is the received message. If a message corresponding to the received message is included in the table, the message transmitted at step S3207 is the consolidated message created at step S3206.

FIG. 33 is a third flowchart of the example of handover operations of the relay station. With reference to FIG. 33, operations carried out by the relay station 214 when the timer corresponding to the group x is started at step S3105 depicted in FIG. 31 will be described. The relay station 214 determines whether the timer started at step S3105 of FIG. 31 has ended (step S3301), and stands by until the timer has ended (step S3301: NO). When the timer ends (step S3301: YES), the relay station 214 deletes the group x from the table (step S3302).

The relay station 214 determines whether messages corresponding to the messages making up the group x are saved in the buffer of the relay station 214 (step S3303). If the corresponding messages are not saved in the buffer (step S3303: NO), the relay station 214 ends the series of operations. If the corresponding messages are saved in the buffer (step S3303: YES), the relay station 214 consolidates the messages saved in the buffer into a consolidated message and transmits the consolidated message to the base station (e.g., base station 212) (step S3304), and ends the series of operations.

FIG. 34 depicts an example of the table managed by the relay station. The memory of the relay station 214 stores, for example, a table 3400 depicted in FIG. 34. When dividing a consolidated message from the base station 211 into divided messages, the relay station 214 adds the sequence numbers (seq xxx) and addresses (dest xxx) of the divided messages to the table 3400, as the group x.

FIG. 35 depicts an example of the buffer managed by the relay station. The relay station 214 is provided with, for example, a buffer 3500 depicted in FIG. 35. Upon receiving from the mobile station, a message to which a message included in the table 3400 corresponds, the relay station 214 adds the received message to the buffer 3500. When all messages corresponding to the messages making up the group x of the table 3400 are added to the buffer 3500, the relay station 214 consolidates the messages in the buffer 3500 into a consolidated message and transmits the consolidated message to the base station 212.

FIG. 36 depicts an example of a message transmitted from the base station to the mobile station. In FIG. 36, components identical to those depicted in FIG. 29 are denoted by the same reference numerals used in FIG. 36 and description thereof is omitted. In the example depicted in FIG. 36, it is assumed that n mobile stations including the mobile stations 239 and 240 carry out handover. As depicted in FIG. 36, the consolidated message 2910 transmitted from the base station 211 to the relay station 214 includes individual elements 1 to n for n mobile stations and a common element for the n mobile stations. Individual elements 1 and 2 include the individual element 1 for the mobile station 239 and the individual element 2 for the mobile station 240, respectively.

The relay station 214 obtains the individual elements 1 to n and the common element from the consolidated message 2910, and loads each of the individual elements 1 to n with the common element to divide the consolidated message 2910. The relay station 214 transmits the message 2911 (individual element 1+common element) for the mobile station 239, to the mobile station 239, and also transmits the message 2912 (individual element 2+common element) for the mobile station 240, to the mobile station 240.

FIG. 37 depicts an example of a message transmitted from the base station to the mobile station. In FIG. 37, components identical to those depicted in FIG. 30 are denoted by the same reference numerals used in FIG. 30 and description thereof is omitted. In the example depicted in FIG. 37, it is assumed that n mobile stations including the mobile stations 239 and 240 carry out handover. As depicted in FIG. 37, the message 3011 transmitted from the mobile station 239 to the relay station 214 includes the individual element 1 for the mobile 239 and the common element for the n mobile stations. The message 3012 transmitted from the mobile station 240 to the relay station 214 includes the individual element 2 for the mobile 240 and the common element for the n mobile stations.

The relay station 214 consolidates messages 3011, 3012, . . . by generating the consolidated message 3010 that includes the individual elements 1 to n individually included in the messages 3011, 3012, . . . , and the common element commonly included in the messages 3011, 3012, . . . . The relay station 214 transmits the generated consolidated message 3010 (individual elements 1 to n+common element) to the base station 212.

FIG. 38 is a sequence diagram of an example of handover operations according to the communication system. It is assumed that the base station 211 detects a congested state of the base station 211 (step S3801). The base station 211 transmits a batch handover request to the base station 212 (step S3802). In response, the base station 212 transmits to the base station 211, a batch handover acknowledgment (step S3803).

Subsequently, the base station 211 transmits to the relay station 214, the consolidated message 2910 that includes handover messages for the mobile stations 239 and 240 (step S3804). The relay station 214 then transmits to the mobile station 239, the handover message 2911, which is for the mobile station 239 and separated from the consolidated message 2910 transmitted at step S3804, (step S3805).

The relay station 214 transmits to the mobile station 240, the handover message 2912, which is for the mobile station 240 and separated from the consolidated message 2910 transmitted at step S3804 (step S3806). The relay station 214 temporary stores the mobile stations 239 and 240 to which the handover messages are transmitted at steps S3805 and 3806, and sets the timer for the mobile stations 239 and 240.

The base station 211 transmits to the base station 212, relay station information that indicates that the relay station 214 has transmitted the consolidated message 2910 and mobile station information that indicates the mobile stations 239 and 240 to which the consolidated message 2910 is addressed (step S3807).

Subsequently, in response to the message 2911 transmitted at step S3805, the mobile station 239 transmits to the relay station 214, the message 3011 giving notification of the completion of handover (step S3808). In response to the message 2912 transmitted at step S3806, the mobile station 240 transmits to the relay station 214, the message 3012 giving notification of the completion of handover (step S3809).

It is assumed that the mobile stations 239 and 240 transmit the messages 3011 and 3012 to the relay station 214 before the timer set by the relay station 214 ends. The relay station 214 transmits the consolidated message 3010, which includes the messages transmitted at steps S3808 and S3809, to the base station 212 (step S3810). Hence, handover is carried out to collectively change the communication counterparts of the mobile stations 239 and 240 from the base station 211 over to the base station 212.

In this manner, when the mobile stations 239 and 240 carry out handover of the communication counterpart from the base station 211 to the base station 212, the base station 211 transmits to the relay station 214, the consolidated message 2910, which includes the handover messages 2911 and 2922 for the mobile stations 239 and 240.

The relay station 214 transmits to the mobile stations 239 and 240, the messages 2911 and 2912 into which the consolidated message 2910 transmitted from the base station 211 is divided. The relay station 214 receives the messages 3011 and 3012 transmitted thereto from the mobile stations 239 and 240 in response to the messages 2911 and 2912 transmitted to the mobile stations 239 and 240.

The relay station 214 transmits the consolidated message 3010, which includes the received messages 3011 and 3012, to the base station 212. In this manner, when the communication counterparts of many mobile stations including the mobile stations 239 and 240 are changed from the base station 211 over to the base station 212, the volume of communication between the base station 211 and the relay station 214 and, between the relay station 214 and the base station 212 can be kept small.

As described, according to the relay station, the base station, the mobile station, the communication system, and the communication method, load information concerning communication of the second base station, which is different from the first base station, can be collected in advance. When the first base station enters a congested state, etc., the second base station is selected as a new communication counterpart based on the load information, thereby improving communication quality.

The relay station, the base station, the mobile station, the communication system, and the communication method disclosed herein offer an effect of improving communication quality.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay station capable of communicating with a first base station, a second base station, and a mobile station, the relay station comprising:
    a relay unit configured to relay communication between the first base station and the mobile station;
    a receiving unit configured to receive load information concerning the second base station;
    a changeover unit configured to change, from the first base station over to the second base station, a communication counterpart of the mobile station, communicating with the mobile station via the relay unit, the communication counterpart being changed based on the received load information; and
    a transmitting unit configured to transmit to the first base station, base station information that indicates the second base station, wherein
    the changeover unit controls the first base station to change the communication counterpart based on the base station information transmitted by the transmitting unit.

2. The relay station according to claim 1, wherein
    the receiving unit receives the load information for a plurality of the second base stations, and
    the changeover unit selects based on the received load information and from among the second base stations, a base station as a new communication counterpart and changes the communication counterpart over to the selected base station.

3. The relay station according to claim 1 and further comprising a communication load monitoring unit configured to monitor a load volume of communication by the relay unit, wherein
    the changeover unit changes the communication counterpart based on the load information and a monitoring result obtained by the communication load monitoring unit.

4. The relay station according to claim 3, wherein the changeover unit calculates for the second base station and based on the load information and the monitoring result, a load volume expected to result when the communication counterpart is changed over to the second base station, and based on a calculation result, changes the communication counterpart.

5. The relay station according to claim 3 and further comprising a power measuring unit configured to measure incoming signal power from the second base station, wherein
    the changeover unit changes the communication counterpart based on the measured incoming signal power, the monitoring result, and the load information.

6. The relay station according to claim 1, wherein the receiving unit receives the load information distributed by the second base station through radio communication.

7. The relay station according to claim 1, wherein the receiving unit receives the load information from the second base station through the first base station.

8. The relay station according to claim 1, wherein the changeover unit changes the communication counterpart upon receiving a congestion notification signal indicating that the first base station is in a congested state.

9. The relay station according to claim 1, wherein the changeover unit changes the communication counterpart upon receiving a cell barring notification signal indicating that the first base station is in a cell barring state.

10. The relay station according to claim 1, wherein the receiving unit periodically receives the load information.

11. The relay station according to claim 1, wherein the load information is information that indicates a margin of a processing load volume of the second base station.

12. A communication system comprising a first base station; a second base station; a relay station; and a mobile station capable of communicating with the first base station and with the second base station through relay by the relay station, wherein
    the second base station transmits to the relay station, load information concerning the second base station,
    the relay station transmits to the first base station, base station information that indicates the second base station, wherein the relay station controls the first base station to change a communication counterpart based on the base station information transmitted by the relay station, and
    changes the communication counterpart of the mobile station communicating with the first base station from the first base station over to the second base station, based on the load information transmitted by the second base station.

13. The communication system according to claim 12, wherein when the mobile station performs handover of the communication counterpart from the first base station to the second base station, the first base station transmits to the relay station, a consolidated message that includes individual messages for handover of a plurality of the mobile stations, and the relay station transmits to the mobile stations, the individual messages into which the consolidated message is divided, and further transmits to the second base station, a consolidated message that includes individual messages transmitted from the mobile stations in response to the individual messages transmitted to the mobile stations.

14. A communication method comprising:
    performing communication between a first base station, a second base station, and a mobile station through relay by a relay station;
    transmitting from the second base station to the relay station, load information concerning the second base station in a vicinity of the relay station;
    transmitting to the first base station, by the relay station, base station information that indicates the second base station, wherein the relay station controls the first base station to change a communication counterpart based on the base station information transmitted by the relay station; and
    changing the communication counterpart of the mobile station from the first base station over to the second base station, based on the transmitted load information.

15. A base station comprising:
    a communication unit configured to communicate with a mobile station through relay by a relay station;
    a receiving unit configured to receive load information concerning another base station in a vicinity of the relay station; and
    a changeover unit configured to change a communication counterpart of the mobile station from the base station over to the other base station, based on the load information received by the receiving unit.

16. The base station according to claim 15 and further comprising a second receiving unit configured to receive communication load information that indicates a load volume of communication by the relay station, wherein the changeover unit changes the communication counterpart based on the load information and the load volume indicated by the communication load information.

17. The base station according to claim 16 and further comprising a third receiving unit configured to receive information that indicates incoming signal power from the other base station and measured at the relay station, wherein
the changeover unit changes the communication counterpart based on the incoming signal power indicated by the information received by the third receiving unit, the communication load information, and the load information.

18. A relay station capable of communicating with a first base station, a second base station, and a mobile station, wherein
the relay station starts relaying communication between the second base station and the mobile station when the first base station changes a communication counterpart of the mobile station from the first base station over to the second base station, based on load information concerning the second base station.

19. A mobile station capable of communicating with a first base station and with a second base station through relay by a relay station, wherein
the mobile station, when during communication with the first base station through relay by the relay station, the first base station changes a communication counterpart of the mobile station from the first base station over to the second base station based on load information concerning the second base station in a vicinity of the relay station, continues communication by communicating with the second base station through relay by the relay station.

20. A communication system comprising a first base station; a second base station; a relay station; and a mobile station capable of communicating with the first base station and with the second base station through relay by the relay station, wherein
the second base station transmits to the first base station, load information concerning the second base station, and
the first base station changes a communication counterpart of the mobile station communicating with the first base station from the first base station over to the second base station, based on the load information transmitted by the second base station.

21. A communication method comprising:
performing communication between a first base station and a mobile station through relay by a relay station;
transmitting from a second base station to the first base station, load information concerning the second base station in a vicinity of the relay station;
transmitting to the first base station, by the relay station, base station information that indicates the second base station, wherein the relay station controls the first base station to change a communication counterpart based on the base station information transmitted by the relay station; and
changing the communication counterpart of the mobile station from the first base station over to the second base station, based on the transmitted load information.

* * * * *